(12) United States Patent
Komaba et al.

(10) Patent No.: US 9,088,678 B2
(45) Date of Patent: Jul. 21, 2015

(54) IMAGE PROCESSING DEVICE, NON-TRANSITORY COMPUTER READABLE RECORDING MEDIUM AND OPERATIONAL EVENT DETERMINING METHOD

(71) Applicant: Konica Minolta, Inc., Chiyoda-ku (JP)

(72) Inventors: Kenichi Komaba, Toyokawa (JP); Hideyuki Matsuda, Hirakata (JP); Yoichi Kurumasa, Toyokawa (JP); Eiichi Narimatu, Fuchu (JP); Takuya Okada, Toyokawa (JP); Kazuhiro Tomiyasu, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/049,975

(22) Filed: Oct. 9, 2013

(65) Prior Publication Data

US 2014/0098402 A1  Apr. 10, 2014

(30) Foreign Application Priority Data

Oct. 10, 2012  (JP) .................................. 2012-224891

(51) Int. Cl.
  *H04N 1/00* (2006.01)
  *G03G 15/00* (2006.01)
  *G06F 9/44* (2006.01)
  (Continued)

(52) U.S. Cl.
  CPC ....... *H04N 1/00381* (2013.01); *G03G 15/5016* (2013.01); *G06F 3/04817* (2013.01); *G06F 3/04883* (2013.01); *G06F 3/04886* (2013.01);
  (Continued)

(58) Field of Classification Search
  USPC .......... 358/1.13, 1.15, 442; 345/173; 715/773
  See application file for complete search history.

(56) References Cited

U.S. PATENT DOCUMENTS 6,094,197 A * 7/2000 Buxton et al. ................. 715/863
7,840,912 B2  11/2010 Elias et al.
(Continued)

FOREIGN PATENT DOCUMENTS

JP  2008-305141 A  12/2008
JP  2009-525538 A  7/2009
(Continued)

OTHER PUBLICATIONS

Office Action issued on Nov. 4, 2014, by the Japan Patent Office in corresponding Japanese Patent Application No. 2012-224891, and an English Translation of the Office Action. (7 pages).

*Primary Examiner* — Allen H Nguyen
(74) *Attorney, Agent, or Firm* — Buchanan Ingersoll & Rooney PC

(57) ABSTRACT

An image processing device includes: a display part on which various types of screens are displayed; a manipulation detecting part for detecting an input by a user on the screen of the display part; a setting part for setting an event to detect in response to the user's input among from multiple events by associating it with each screen displayed on the display part; an event determining part for running only an operational event determining routine corresponding to the event associated by the setting part with the screen being displayed on the display part of multiple operational event determining routines, each of which corresponds to the respective events, when the user's input is detected by the manipulation detecting part, thereby specifying the event corresponding to the user's input; and a controlling part for controlling operations based on the event specified by the event determining part.

20 Claims, 17 Drawing Sheets

(51) Int. Cl.
*G06F 3/0488* (2013.01)
*G06F 3/0481* (2013.01)

(52) U.S. Cl.
CPC .... *G06F 9/4443* (2013.01); *G06F 2203/04806* (2013.01); *G06F 2203/04808* (2013.01)

(56) References Cited

U.S. PATENT DOCUMENTS

| | | |
|---|---|---|
| 2007/0177803 A1 | 8/2007 | Elias et al. |
| 2009/0228901 A1 | 9/2009 | Beaver et al. |
| 2011/0157636 A1* | 6/2011 | Maeda ................... 358/1.15 |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0235130 A1* | 9/2011 | Okada ..................... 358/442 |
| 2011/0271199 A1 | 11/2011 | Mori |
| 2012/0105893 A1* | 5/2012 | Ito ........................... 358/1.13 |
| 2012/0131490 A1* | 5/2012 | Lin et al. ................. 715/773 |
| 2012/0159380 A1 | 6/2012 | Kocienda et al. |

FOREIGN PATENT DOCUMENTS

| | | |
|---|---|---|
| JP | 2009-211704 A | 9/2009 |
| JP | 2011-233017 A | 11/2011 |
| WO | 2011/094267 A1 | 8/2011 |
| WO | 2012/087939 A1 | 6/2012 |

* cited by examiner

FIG. 12

| | FLICK | DRAG | SINGLE TAP | DOUBLE TAP | LONG TAP | PINCH |
|---|---|---|---|---|---|---|
| FUNCTION SELECTING SCREEN | YES (WITH CONDITION) | YES | YES | | | |
| LIST SCREEN | YES (WITH CONDITION) | YES | YES | YES | | |
| THUMBNAIL IMAGE SCREEN | YES (WITH CONDITION) | YES | YES | YES | | |
| PREVIEW IMAGE SCREEN | | YES (WITH CONDITION) | | YES | YES | YES |
| APPLIED SETTING SCREEN | YES | YES | YES | | | |
| BASIC SETTING SCREEN | YES | | YES | | | |

IMAGE PROCESSING DEVICE, NON-TRANSITORY COMPUTER READABLE RECORDING MEDIUM AND OPERATIONAL EVENT DETERMINING METHOD

This application is based on the application No. 2012-224891 filed in Japan, the contents of which are hereby incorporated by reference.

BACKGROUND OF THE INVENTION

1. Field of the Invention

The present invention relates to an image processing device, a non-transitory computer readable recording medium and an operational event determining method.

2. Description of the Background Art

Conventional display devices such as smart phones or tablet terminals are capable of detecting complicated gestures input by users, for example, single touch gestures or multi-touch gestures. This known technique is introduced for example in Japanese Patent Application Laid-Open No. JP 2009-525538 A (hereafter, document 1) and Japanese Patent Application Laid-Open No. JP 2009-211704 A (hereafter, document 2). According to the known technique disclosed in document 1, for example, a gesture set is defined in a multi-touch sensing area of the display device. In response to detecting the operation with the multi-touch sensing area, the device specifies one or more gestures event included in the gesture set. According to the known technique disclosed in document 2, for example, a multi-touch flag is added on a region of the display device in advance so that the users are allowed to operate the region with multi-touch gestures.

Recently, image processing devices called as network printers or MFPs (Multi-functional peripherals) having a feature of detecting complicated gestures input by users and allowing the users to configure settings relating to jobs have gradually come into use. The users input a variety of gestures; single tapping, double tapping, long tapping, flicking, dragging, pinching in, pinching out, etc., thereby configuring the settings relating to the jobs or checking image data efficiently.

The aforementioned image processing device is required to precisely detect the gestures input by the user. A plurality of operational event determining routines for each event which is a target of detection such as single tapping, double tapping, long tapping, flicking, dragging, pinching in and pinching out are installed in advance on the image processing device. In response to detecting the input by the user on an operational panel, the image processing device runs each of the plurality of operational event determining routines one after the other, thereby specifying the event corresponding to the input by the user and performing processing corresponding to the specified event.

Various types of screens are displayed on the operational panel of the image processing device. The gestures that the user is allowed to input on each screen are different. More specifically, processing corresponding to a certain event such as processing corresponding to flicking or pinching is not defined in some screens displayed on the operational panel.

When detecting the input by the user, the aforementioned conventional image processing device runs all the plurality of operational event determining routines one after the other. So, even when detecting the input on the screen in which the processing corresponding to flicking is not defined, the image processing device runs the operational event determining routine to detect flicking. The conventional image processing device executes unnecessary operational event determining routine for some screens displayed on the operational panel, so the resource of a CPU and so on is occupied.

Especially this type of image processing devices are allowed to receive input by the user even during execution of a job such as a scan job, a copy job, a print job or a data transmitting and receiving job. When input by the user is detected during execution of the job, the image processing device runs every operational event determining routine one after the other in conjunction with execution of the job in order to specify the event corresponding to the detected input. It is assumed, for example, the screen in which the processing corresponding to flicking is not defined is displayed during execution of the job. Even in such a case, if the user uses flicking as an erroneous operation, the CPU runs every operational event determining routine one after the other in the background of execution of the job and specifies that the event input by the user is flicking. The processing corresponding to flicking is not defined in the screen, so even when the CPU is allowed to specify that the event is flicking, it does not perform any special following processing.

The input by the user during execution of the job may not be erroneous operation. Even in such a case, every operational event determining routine is run one after the other in response to detecting the input by the user. The operational event corresponding to the user's input is then not allowed to be specified efficiently, and the occupancy of the CPU is increased more than necessary.

As described above, every operational event determining routine is run in response to detecting user's input. On the image processing device with this configuration, when image data containing data of a plurality of pages or high-resolution image data needs to be processed during execution of the job, the image processing delays because the CPU executes unnecessary operational event determining routine, resulting in low productivity of the image processing device.

SUMMARY OF THE INVENTION

The present invention is intended to solve the above problems. Thus, the present invention is intended to provide an image processing device, a non-transitory computer readable recording medium and an operational event determining method capable of efficiently specifying an event corresponding to an input by a user by running only a necessary operational event determining routine in response to a screen without running every operational event determining routine one after the other when detecting input by the user.

First, the present invention is directed to an image processing device.

According to an aspect of the image processing device, the image processing device comprises: a display part on which various types of screens are displayed; a manipulation detecting part for detecting an input by a user on the screen of the display part; a setting part for setting an event to detect in response to the user's input among from multiple events by associating the event with each screen displayed on the display part; an event determining part for running only an operational event determining routine corresponding to the event associated by the setting part with the screen being displayed on the display part of multiple operational event determining routines, each of which corresponds to the respective events, when the user's input is detected by the manipulation detecting part, thereby specifying the event corresponding to the user's input; and a controlling part for controlling operations based on the event specified by the event determining part.

Second, the present invention is directed to a non-transitory computer readable recording medium on which a program is recorded. The program is executable on a computer including a display part on which various types of screens are displayed and a manipulation detecting part for detecting an input by a user on the screen of the display part.

According to an aspect of the non-transitory computer readable recording medium, the program executed on the computer to function as a system comprises: a setting part for setting an event to detect in response to the user's input among from multiple events by associating the event with each screen displayed on the display part; an event determining part for running only an operational event determining routine corresponding to the event associated by the setting part with the screen being displayed on the display part of multiple operational event determining routines, each of which corresponds to said respective events, when the user's input is detected by the manipulation detecting part, thereby specifying the event corresponding to the user's input; and a controlling part for controlling operations based on the event specified by the event determining part.

Third, the present invention is directed to an operational event determining method for determining an event corresponding to an input by a user with a display part on which various types of screens are displayed based on the user's input.

According to an aspect of the operational event determining method, the operational event determining method comprises the steps of: (a) setting the event to detect in response to the user's input among from multiple events by associating the event with each screen displayed on the display part; (b) detecting the input by the user with one of the screens being displayed on the display part; and (c) running only an operational event determining routine corresponding to the event associated with the screen of multiple operational event determining routines, each of which corresponds to the respective events, thereby determining the event corresponding to the user's input.

BRIEF DESCRIPTION OF THE DRAWINGS

FIGS. 7A, 7B and 7C show an example of a list screen on which multiple pieces of information is shown in a list form;

FIG. 12 shows an exemplary relation between each of the screens and an event receivable on the corresponding screen;

DESCRIPTION OF THE PRESENT PREFERRED EMBODIMENTS

Figure 1:
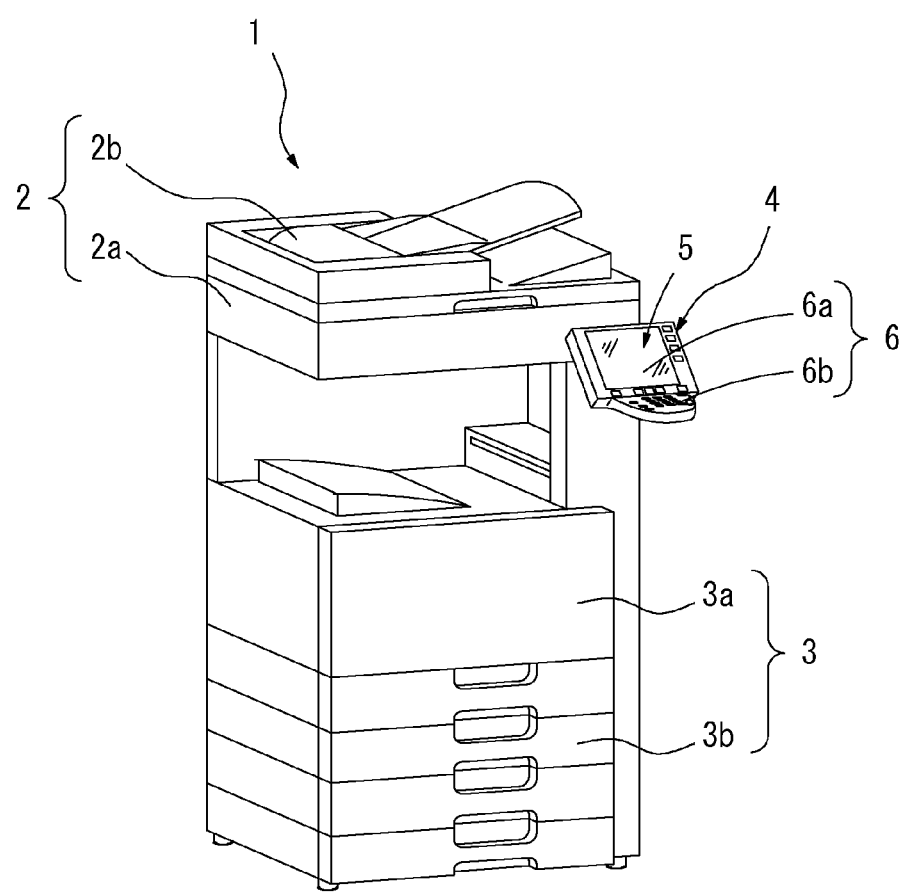
FIG. 1 shows an exemplary outline configuration of an image processing device.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary outline configuration of an image processing device 1 of the present preferred embodiment. The image processing device 1 is formed from one of MFPs (Multi-functional peripherals) and includes a variety of functions such as a scan function, a print function, a copy function, a fax function, a network function and an email transmitting and receiving function. The image processing device 1 executes a job designated by a user. The image processing device 1 includes a scanner section 2 on the upper side of its device body. The scanner section 2 is driven in response to the scan job. The scanner section 2 includes an image reading part 2a that optically reads images of a document and a document feeding part 2b that automatically feeds each page of the document to the image reading part 2a. The scanner section 2 reads each page of the document placed by the user and generates image data of the read pages. The image processing device 1 also includes a printer section 3 on the lower central part of its device body. The printer section 3 is driven in response to executing the print job. The printer section 3 includes an image forming part 3a that forms images by a method such as an electrophotographic method based on the input image data and outputs and a paper feeding part 3b that feeds sheet materials such as printing papers one by one to the image forming part 3a. The printer section 3 produces a printed output based on the image data specified by the user.

The image processing device 1 is provided with an operational panel 4, a user interface operable by the user in use of the image processing device 1, on its front side. The operational panel 4 includes a display unit 5 on which a variety of information is displayed to the user and a manipulation unit 6 through which the user gives an input. The display unit 5 formed from a liquid-crystal color display in a predetermined screen size, for instance, is capable of displaying a variety of images. The manipulation unit 6 is formed from a touch panel sensor 6a arranged on the screen of the display unit 5 and a plurality of push-button operational keys 6b arranged around the screen of the display unit 5. The user gives various types of inputs to the manipulation unit 6 with viewing the screen displayed on the display unit 5, thereby configuring settings for execution of the job or giving instructions on execution of the job to the image processing device 1.

The touch panel sensor 6a arranged on the screen of the display unit 5 is capable of detecting not only single touch gestures but also multi-touch gestures performed by the user. The user is allowed to perform single touch gestures by touching one point on the screen of the display unit 5, and single touch gestures include, for instance, single tapping, double tapping, long tapping, flicking and dragging. The user is allowed to perform multi-touch gestures by touching multiple points on the screen of the display unit 5 simultaneously, and multi-touch gestures include pinching, for instance, pinching in, pinching out and rotating. In response to being tapped at least one point on the screen of the display unit 5, the touch panel sensor 6a is allowed to identify the position where the user tapped (hereafter, tapped position) and to detect the release operation from the tapped state or moving in any direction of the tapped position after identifying the tapped position. Thus, the user is allowed to configure settings relating to the job by performing the variety of gestures on the screen of the display unit 5.

The push-button operational keys 6b arranged around the screen of the display unit 5 are formed from keys such as a numeric keypad featuring digits 0 to 9 keys. The push-button operational keys 6b detects only pressing operation by the user.

Figure 2:
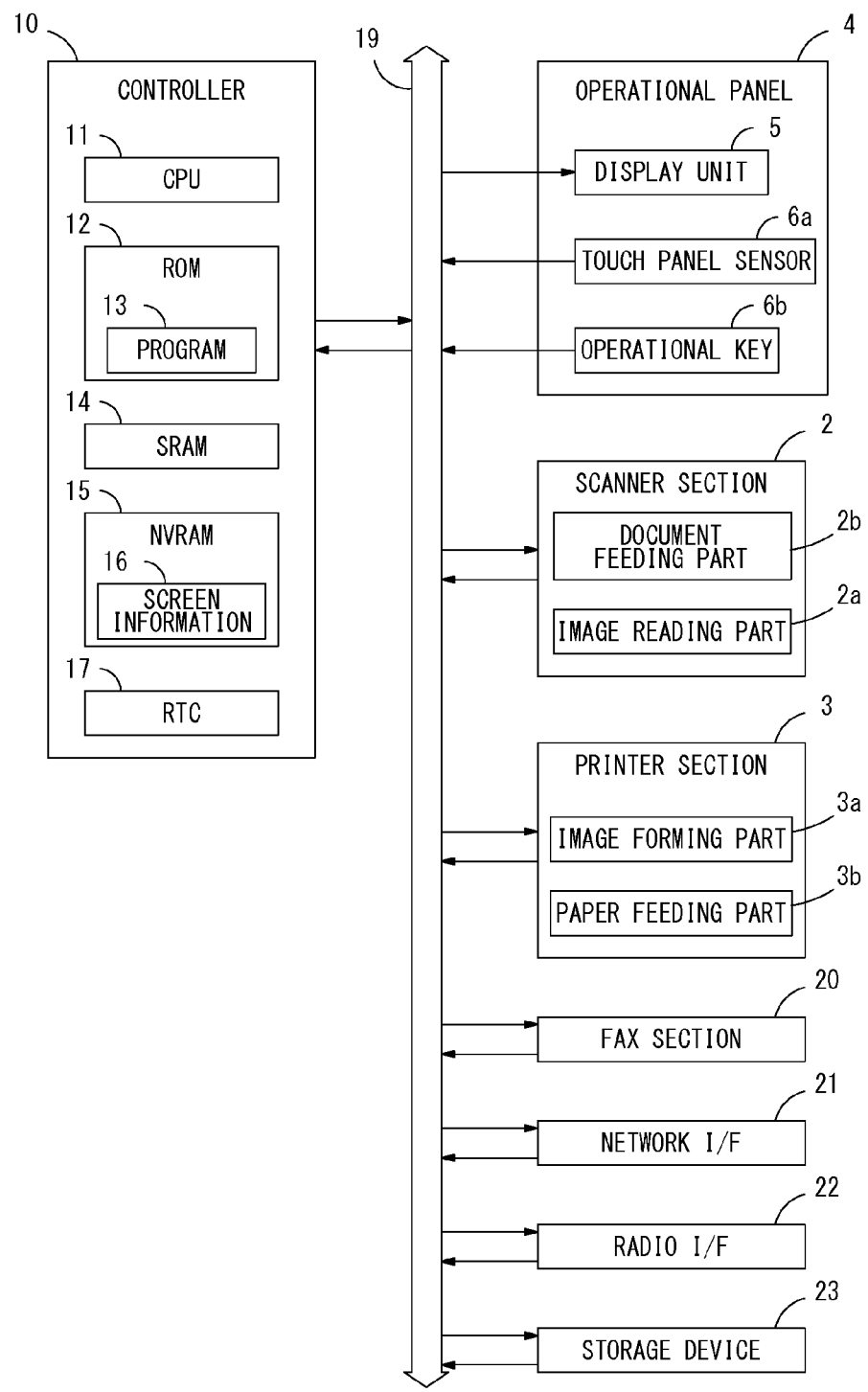
FIG. 2 is a block diagram showing an exemplary hardware configuration of the image processing device.

FIG. 2 is a block diagram showing an exemplary hardware configuration of the image processing device 1. As illustrated in FIG. 2, the image processing device 1 includes a controller 10, a fax section 20, a network interface 21, a radio interface 22 and a storage device 23 besides the aforementioned scanner section 2, printer section 3, and operational panel 4. These parts are allowed to transmit and receive data with each other via a data bus 19.

The controller 10 controls overall operations of each operational panel 4, scanner section 2, printer section 3, fax section 20, network interface 21, radio interface 22 and storage device 23 as shown in FIG. 2. The fax section 20 transmits and receives fax data over public phone lines not shown in figures. The network interface 21 is for connecting the image processing device 1 to a network such as LAN (Local Area Network). The radio interface 22 is for establishing radio communication with NFC (Near Field Communication) with an external device. The storage device 23 is a nonvolatile storage part formed from a device such as a hard disk drive (HDD) or a solid state drive (SSD), for instance, to temporarily store therein image data received over the network or image data generated by the scanner section 2.

As illustrated in FIG. 2, the controller 10 includes a CPU 11, a ROM 12, a SRAM 14, a NVRAM 15 and a RTC 17. After the image processing device 1 is powered on, the CPU 11 reads and executes a program 13 stored on the ROM 12. The controller 10 then starts controlling operations of each part as described above. Especially the CPU 11 is a main part that controls operations of the image processing device 1, and controls not only execution of the job but also operations of the operational panel 4 which serves as the user interface. To be more specific, the CPU 11 controls switching of screens displayed on the display unit 5 of the operational panel 4. Also, when the touch sensor 6a or the operational keys 6b detect the user's input, the CPU 11 specifies the input corresponds to what event and controls operations in response to the specified event. The event is the operational event which is the input by the user, and includes multiple events such as single tapping, double tapping, long tapping, flicking, dragging and pinching as the events in response to the user's input performed on the touch sensor 6a, for example. When the CPU 11 controls operations in response to the specified event, it controls switching of the screens, starting execution of the job or terminating execution of the job, for example. The operations of the CPU 11 are described in detail later.

The SRAM 14 is a memory that provides a storage region for operations by the CPU 11. The SRAM 14 stores therein temporary data required in accordance with execution of the program 13 by the CPU 11.

The NVRAM 15 is a battery backup nonvolatile memory, and stores therein data including various types of setting values or information on the image processing device 1. Screen information 16 is stored on the NVRAM 15 in advance as shown in FIG. 2. Information relating to multiple screens displayed on the display unit 5 of the operational panel 4 is stored as the screen information 16. The screen information 16 of each screen contains a variety of images such as icon images or button images operable by the user by tapping, and screen structures that allow the user to perform gestures are defined in the screen information 16. Each of the multiple screens displayed on the display unit 5 has different screen structure. Thus, even when the user performs gestures on the touch sensor 6a, the event that can be received on each screen differs.

The RTC 17 is a real-time clock and is a clock circuit continues to count present time.

Figure 3:
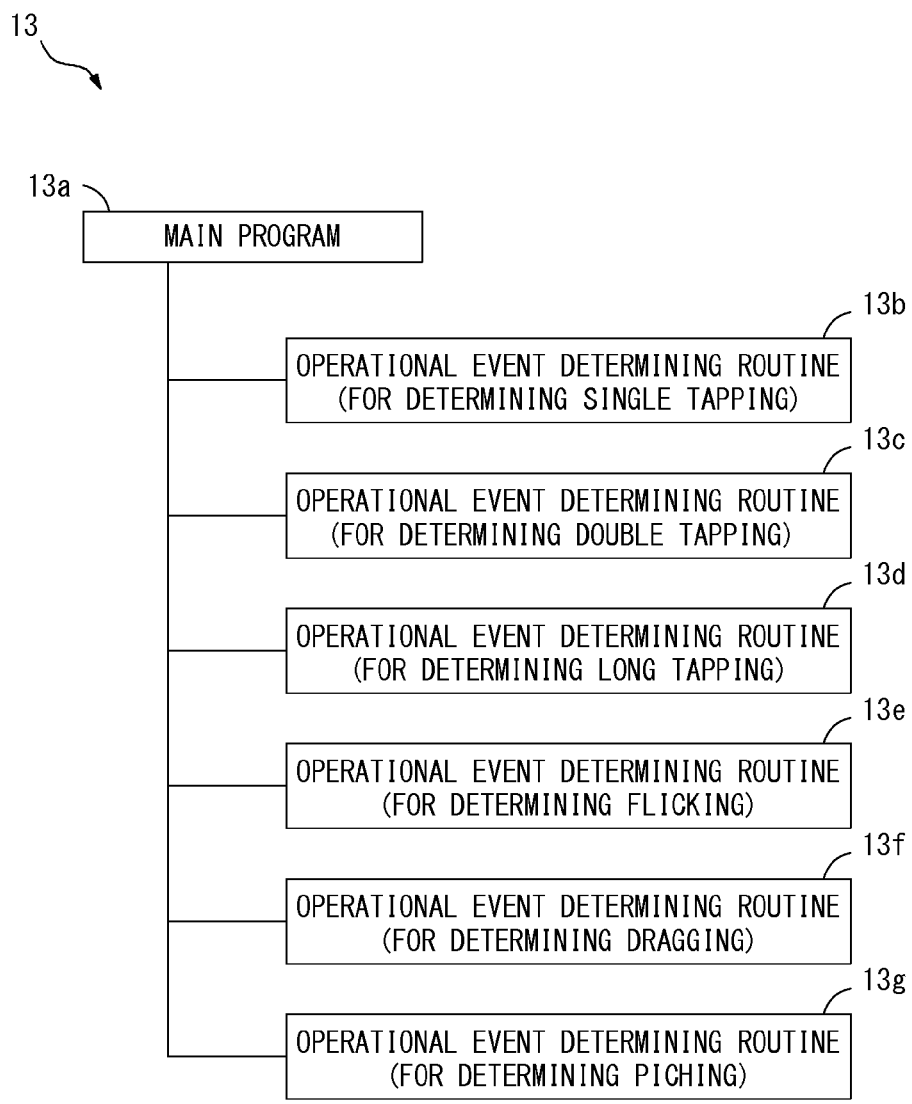
FIG. 3 shows an exemplary conceptual configuration of a program executed by a CPU.

FIG. 3 shows an exemplary conceptual configuration of the program 13 executed by the CPU 11. The program 13 includes a main program 13a and a plurality of operational event determining routines 13b, 13c, 13d, 13e, 13f, and 13g. The main program 13a is automatically read and executed by the CPU 11 when the image processing device 1 is powered on. The plurality of operational event determining routines 13b, 13c, 13d, 13e, 13f, and 13g are provided in advance as sub routines for the main program 13a. The plurality of operational event determining routines 13b, 13c, 13d, 13e, 13f, and 13g are the sub routines for specifying the user's input corresponds to which event, single tapping, double tapping, long tapping, flicking, dragging or pinching when the touch sensor 6a detects the input (gesture) by the user. Because the detail of the contents or the procedure of the determining processing is different for each event to specify, the operational event determining routine is provided in advance for each event. When the touch sensor 6a detects the input by the user, the CPU 11 of the present preferred embodiment runs only the necessary operational event determining routine of the plurality of operational event determining routines 13b, 13c, 13d, 13e, 13f, and 13g, thereby specifying efficiently the event corresponds to the input. The detailed processing performed by the CPU 11 is explained next.

Figure 4:
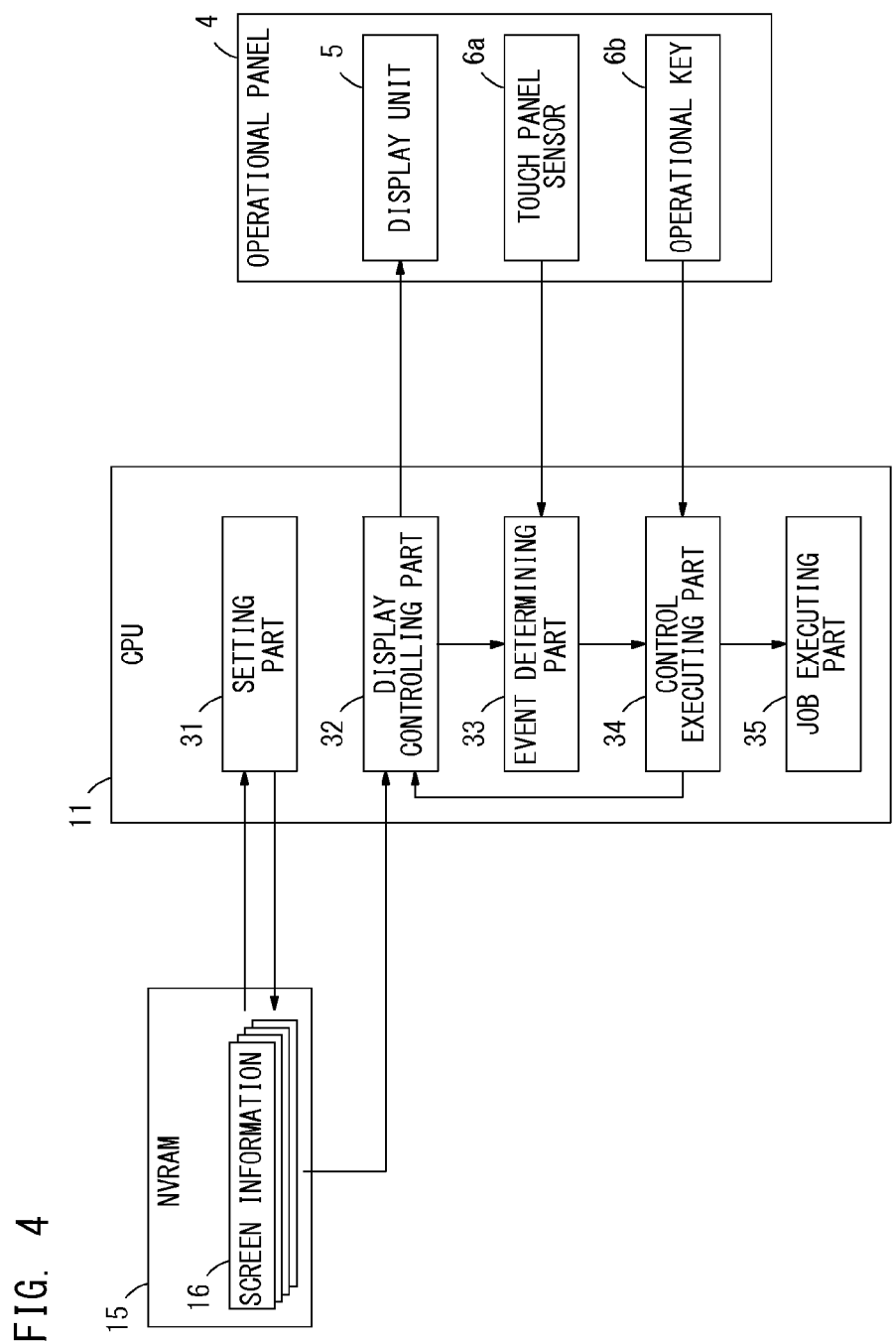
FIG. 4 is a block diagram showing an exemplary functional configuration realized when the CPU runs a main program.

FIG. 4 is a block diagram showing an exemplary functional configuration realized when the CPU 11 runs the main program 13a. As illustrated in FIG. 4, the CPU 11 executes the main program 13a, thereby serving as a setting part 31, a display controlling part 32, an event determining part 33, a control executing part 34 and a job executing part 35.

The setting part 31 sets the event to detect in response to the user's input by associating it with the respective screens displayed on the display unit 5 among from the multiple events. To be more specific, the setting part 31 reads and analyzes the screen information 16 stored in the NVRAM 15, thereby specifying the event that can be received on each screen and associates in advance the specified event with each screen. The setting part 31, for example, adds information relating to the specified event to the screen information 16 of each screen, thereby setting the event corresponding to each screen. The setting part 31 is configured to associate at least one of the multiple events, single tapping, double tapping, long tapping, flicking, dragging or pinching with the screen. If the screen is capable of receiving all the events, for example, the setting part 31 associates every event with the screen.

The information showing the correspondency between the event and the screen may be added in advance when the screen information 16 is stored in the NVRAM 15 at shipping of the image processing device 1. The screen information 16 stored in the NVRAM 15 may be updated after the shipping of the image processing device 1 due to, for instance, addition of optional features, installation of new application programs or customization of screens. Once the screen information 16 is updated, the screen structure of the screen changes. In some cases, as a result of the change in the screen structure, the events that cannot be received on the screen before the update may be received after the update of the screen information 16. Thus, the setting part 31 is brought into operation at first after the CPU 11 executes the main program 13a, and sets the event to detect in response to the user's input among from the multiple events by associating it with each screen.

The display controlling part 32 reads the screen information 16 stored in the NVRAM 15 and selects one of the multiple screens, then outputting to the display unit 5, thereby displaying the selected screen on the display unit 5. After the image processing device 1 is started up, the display controlling part 32 selects an initial screen among from the multiple screens and displays the selected initial screen on the display unit 5. After that, the display controlling part 32 sequentially updates the screen on the display unit 5 in response to screen update instructions from the control executing part 34.

The event determining part 33 specifies the event corresponding to the input when the touch sensor 6a of the operational panel 4 detects the input on the screen by the user. The event determining part 33 is one of functions realized by the main program 13a. After the touch sensor 6a detects the user's input, the event determining part 33 specifies the event that is associated in advance with the screen being displayed on the display unit 5 at detection of the user's input, and runs only the operational event determining routine corresponding to the specified event, thereby specifying the event corresponding to the user's input. To be more specific, in response to detecting the user's input on the screen, the event determining part 33 runs only the operational event determining routine corresponding to the event associated with the screen by the setting part 31 of the plurality of operational event determining routines 13b, 13c, 13d, 13e, 13f, and 13g to determine only the event that can be received on the screen. In this case, more than one event may be associated with the screen. It is assumed, for example, three events, single tapping, double tapping and flicking, are receivable on the screen displayed on the display unit 5. In such a case, the event determining part 33 runs the operational event determining routine corresponding to each event one after the other, thereby specifying the event corresponding to the user's input. As described above, when some kind of input performed by the user is detected by the touch sensor 6a, the event determining part 33 does not run all the operational event determining routines 13b, 13c, 13d, 13e, 13f, and 13g every time the input is detected. The event determining part 33 runs only the operational event determining routine corresponding to the event which can be received on the screen displayed on the display unit 5 at the detection. As a result, the event corresponding to the user's input may be specified efficiently without running unnecessary determining routines.

After specifying the event corresponding to the user's input by running only the necessary operational event determining routine, the event determining part 33 outputs the specified event to the control executing part 34. The event determining part 33 sometimes is not able to specify the event corresponding to the user's input even by running only the necessary operational event determining routine as described above. It is assumed, for example, the user performs the gesture, such as long tapping, dragging or pinching on the screen which can only receive three events, single tapping, double tapping and flicking. In this case, the event determining part 33 is not allowed to specify the event corresponding to the user's input even by running the operational event determining routines 13b, 13c and 13d corresponding to the respective events, single tapping, double tapping and flicking. The event determining part 33 then does not output any information to the control executing part 34.

The control executing part 34 controls operations based on the user's input when the user inputs to the operational panel 4. When the gesture is input by the user to the touch sensor 6a, the control executing part 34 receives the event specified by the aforementioned event determining part 33 and controls operations based on the event. When at least one of the operational keys 6b is pressed by the user, the control executing part 34 receives an operational signal directly from the operational key 6b and specifies the gesture (event) input by the user based on the received operational signal. The control executing part 34 then controls operations based on the gesture. When controlling based on the user's input, the control executing part 34 controls, for example, update of the screen displayed on the display unit 5, or start and termination of execution of the job. The control executing part 34, therefore, controls the display controlling part 32 and the job executing part 35 as shown in FIG. 4. More specifically, the control executing part 34 gives instructions to update screens to the display controlling part 32 for updating the screen in response to the user's input, and gives instructions to start or terminate execution of the job to the job executing part 35 for starting or terminating execution of the job. Thus, the controlling part 32 updates the screen displayed on the display unit 5 in response to the instruction by the control executing part 34. Also, the job executing part 35 starts execution of the job or terminates the job already being executed in response to the instruction by the control executing part 34. The control executing part 34, however, is capable of controlling other operations besides ones described above.

The job executing part 35 controls operations of each part of the image processing device 1, thereby controlling execution of the job given by the user. The job executing part 35 is resident in the CPU 11 to control overall operations of each part while the job is executed on the image processing device 1.

Figure 5:
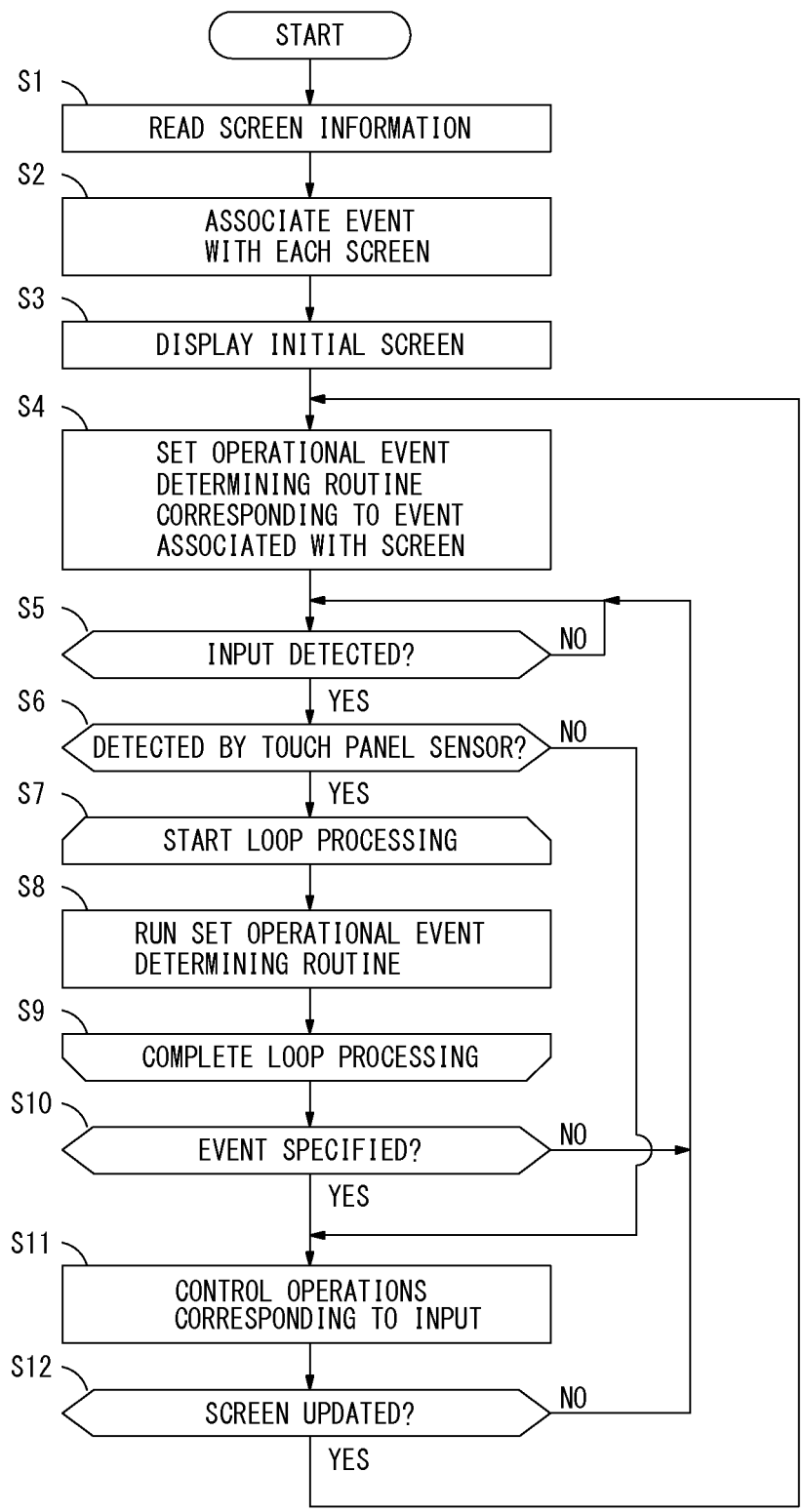
FIG. 5 is a flow diagram explaining an exemplary sequential procedure of the process performed by the CPU of the image processing device.

The detailed sequential procedure of the process performed by the CPU 11 having the aforementioned functional configuration is described next. FIG. 5 is a flow diagram explaining an exemplary sequential procedure of the process performed by the CPU 11 of the image processing device 1. This process is performed after the image processing device 1 is powered on and the main program 13a of the program 13 is run by the CPU 11.

In response to running the main program 13a, the CPU 11 reads the screen information 16 (step S1), and associates the event with each screen based on the read screen information 16 (step S2). After associating the event with all the screens, the CPU 11 displays the initial screen on the display unit 5 of the operational panel 4 (step S3). With the screen displayed on the display unit 5 as described above, the CPU 11 sets the operational event determining routine corresponding to the event associated with the screen (step S4). Thus, the operational event determining routine corresponding to the event which can be received on the screen being displayed on the display unit 5 is prepared in advance.

The CPU 11 is then put into a standby state until either the touch sensor 6a or operational keys 6b detect the input (step S5). After the user's input is detected (when a result of step S5 is YES), the CPU 11 determines whether or not the input is detected by the touch sensor 6a (step S6). If the input is detected by the touch sensor 6a (when a result of step S6 is YES), the CPU 11 runs the operational event determining routine set in advance in step S4 one after the other and performs loop processing to specify the event corresponding to the user's input (steps S7, S8 and S9). In this loop processing (steps S7, S8 and S9), all the operational event determining routines 13b to 13g included in the program 13 are not run one after the other. Instead of that, only the operational event determining routine which is set in step S4 and corresponding to the event which can be received on the screen currently displayed is run. More than one operational event determining routine may be run one after the other in the loop processing. In such a case, after the event corresponding to the user's input is specified by running one of the operational event determining routines, the loop processing is complete at the time when the event is specified. To be more specific, in the loop processing (steps S7, S8 and S9), all of more than one operational event determining routine set in step S 4 are not always run. If the event corresponding to the user's input is specified before running all of more than one operational event determining routine, the loop processing is complete without running the operational event determining routine which is to be run after the operational event determining routine with which the event is specified.

After completing the loop processing (steps S7, S8 and S9), the CPU 11 determines whether or not the event is specified through the loop processing (steps S7, S8 and S9) (step S10). The user sometimes inputs the gesture which is not receivable on the screen being displayed, so the determination in step S10 is required. When the event corresponding to the user's input is not specified (when a result of step S10 is NO), the CPU 11 returns to the standby state until the user's input is detected (step S5) without performing the following processing (step S11). When the event corresponding to the user's input is successfully specified through the loop processing (steps S7, S8 and S9) (when a result of step S10 is YES), the CPU 11 moves on to the processing in next step S11.

When the user's input is detected (when a result of step S5 is YES) and the user's input is detected by the operational keys 6b (when a result of step S6 is NO), the CPU 11 moves on to the processing in step S11. Specifically, when the user presses at least one of the operational keys 6b, the event may be detected based on the operational signal, so the CPU 11 moves on to the processing (step S11) which is carried out when the event is successfully specified.

In response to successfully specifying the event corresponding to the user's input, the CPU 11 controls operations corresponding to the user's input (step S11). To be more specific, the CPU 11 then controls update of the screen displayed on the display unit 5, execution of the job or other operations as described above. The CPU 11 then determines whether or not the screen displayed on the display unit 5 is updated as a result of control in step S1 (step S12). If the screen is updated (when a result of step S12 is YES), the CPU 11 returns to the processing in step S4 to set the operational event determining routine corresponding to the event associated with the screen displayed after the update (step S4). When the screen is not updated (when a result of step S12 is NO), the CPU 11 returns to the processing in step S5 and is put into the standby state until the user's input is detected again (step S5). The CPU 11 then repeats the aforementioned processing.

The CPU 11 performs the processing as described above, thereby performing the processing corresponding to the input when the input is performed by the user on the operational panel 4. Especially the aforementioned processing is sometimes performed in parallel with execution of the job. When, however, some kind of gesture is input by the user on the screen, minimum operational event determining routine is run in order to specify only the event receivable on the screen. As a result, unnecessary operational event determining routine is not required to be run in execution of the job, so the event corresponding to the user's gesture may be specified efficiently.

Figure 6:
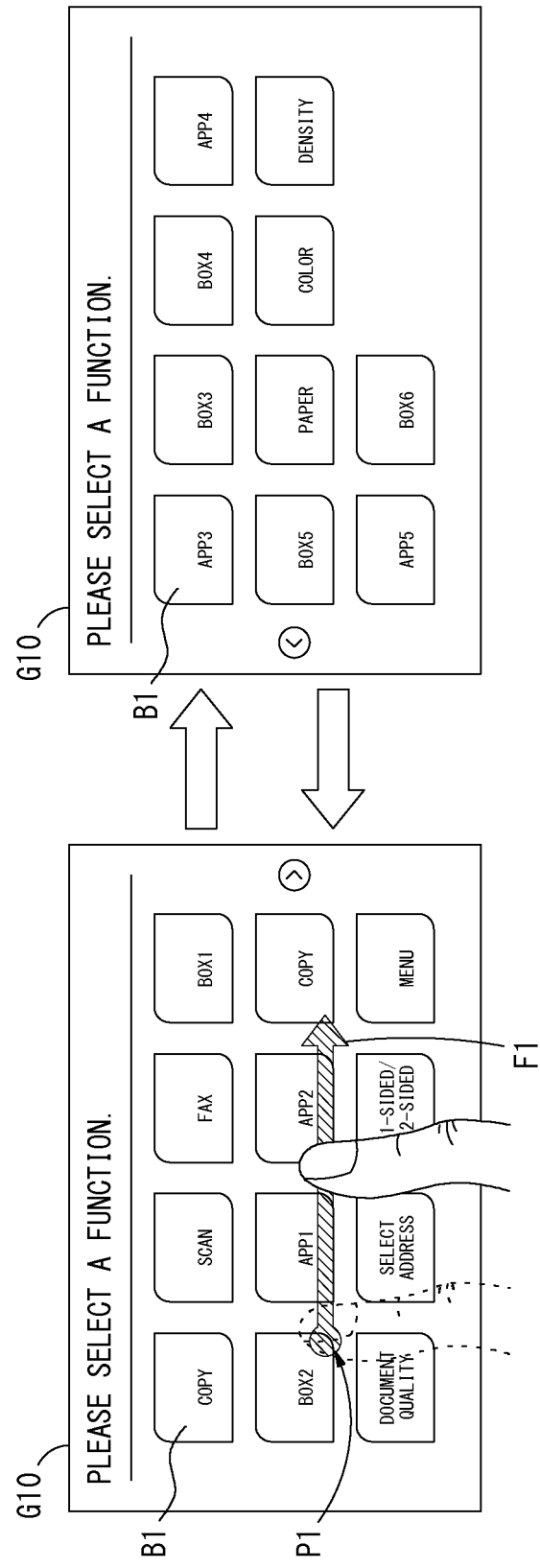
FIG. 6 shows an example of a function selecting screen.

Next, the event associated with each screen is explained with some exemplary screens displayed on the display unit 5 of the present preferred embodiment. FIG. 6 shows an example of a function selecting screen G10. The function selecting screen G10 has its screen structure as an operational keys displaying screen which includes icon images B1 arranged on the screen as operational keys. The icon images B1 shown in the function selecting screen G10 may be added due to addition of optional features, installation of new application programs or customization of screens. The customization of screens, for example, includes that due to additional registration with the function selecting screen G10 of the icon images usually shown in another screen as shortcut keys. The exemplary screen illustrated in FIG. 6 shows that 12 icon images that can be displayed at once in an icon image displaying region of the function selecting screen G10, and 22 icon images B1 are registered. Thus, 22 icon images B1 are displayed by scrolling the icon image displaying region.

The gestures the user is allowed to input on the function selecting screen G10 are flicking to scroll the icon image displaying region, single tapping to touch the icon images B1 to select the function and dragging to move the displayed icon images B1 in any direction. As illustrated in FIG. 6, the user flicks by using his or her finger to tap a point P1 on the screen and move the tapped position quickly in a scrolling direction F1, then releasing the finger from the screen. The user flicks on the function selecting screen G10, thereby scrolling the icon image displaying region in a lateral direction as shown in FIG. 6. As a result, the user is allowed to view all the icon images B1. The user makes single tap by using his or her finger to tap a point on the screen and immediately release the finger from the screen. The user makes single tap to one of the displayed icon images B1, thereby selecting one of the multiple icon images B1. The user drags by using his or her finger to tap the point P1 on the screen and move the tapped position, then releasing the finger from the screen at another position. Although, this dragging is similar to flicking, the tapped position may be moved in any direction and it does not have to be a line direction. Also, the user may move the tapped position at a relatively slow rate. The user drags one of the icon images B1, thereby moving the displayed icon image B1 to any position. As described above, three events, single tapping, dragging and flicking are receivable on the function selecting screen G10, and other events are not receivable. The setting part 31 sets three events, single tapping, dragging and flicking, corresponding to the function selecting screen G10 of FIG. 6.

FIGS. 7A, 7B and 7C show an example of a list screen G13 on which multiple pieces of information is shown in a list form. As illustrated in FIG. 7A, the list screen G13 includes a list region R1 showing information relating to multiple addresses that may be selected by the user in a list form. When large amount of information is to be shown in the list region R1, the list screen G13 allows scrolling and moving the list region R1, thereby displaying whole information.

The gestures the user is allowed to input on the list screen G13 is single tapping to select one of the various types of information displayed in the list form as illustrated in FIG. 7B. If the large amount of information is to be displayed, the user may flick to scroll and move the list region R1. The user, for example, taps a point on the list region R1 and flicks in a scrolling direction F2 or F3 with tapping the point, thereby scrolling the information displayed in the list region R1. Also, the user may drag to move the displayed address information shown in the list form or double tap to select one of the address information and switch to a detail setting screen for the selected address. The user makes double tap by inputting the gesture similar as the single tapping twice in a predetermined period of time. As described above, four events, single tapping, dragging, flicking and double tapping are receivable on the list screen G13 illustrated in FIGS. 7A, 7B and 7C, and other events are not receivable. The setting part 31 sets four events, single tapping, dragging, flicking and double tapping, corresponding to the list screen G13 of FIGS. 7A, 7B and 7C.

Figure 8A:
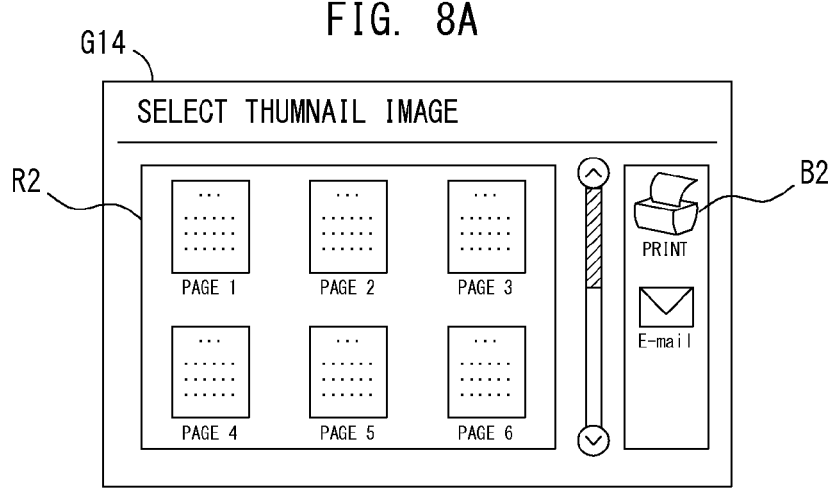
FIGS. 8A, 8B and 8C show an example of a thumbnail image screen that shows a thumbnail image.
Figure 8B:
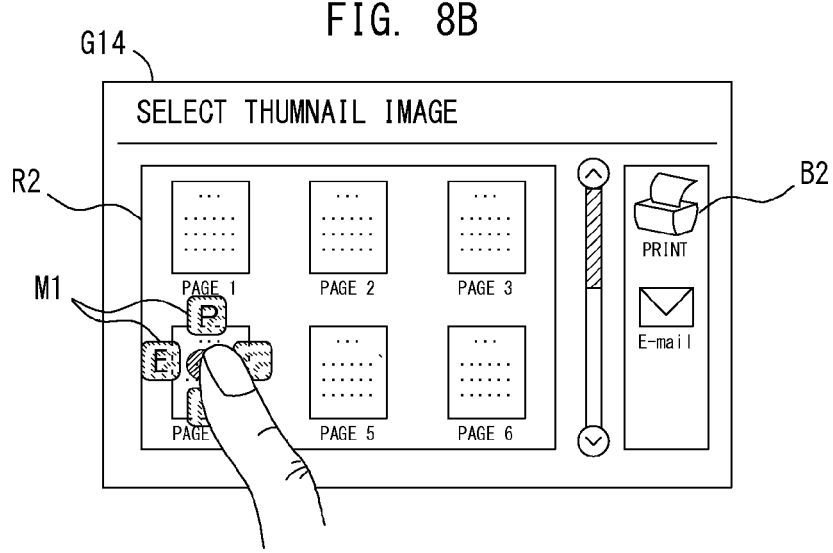
Figure 8C:
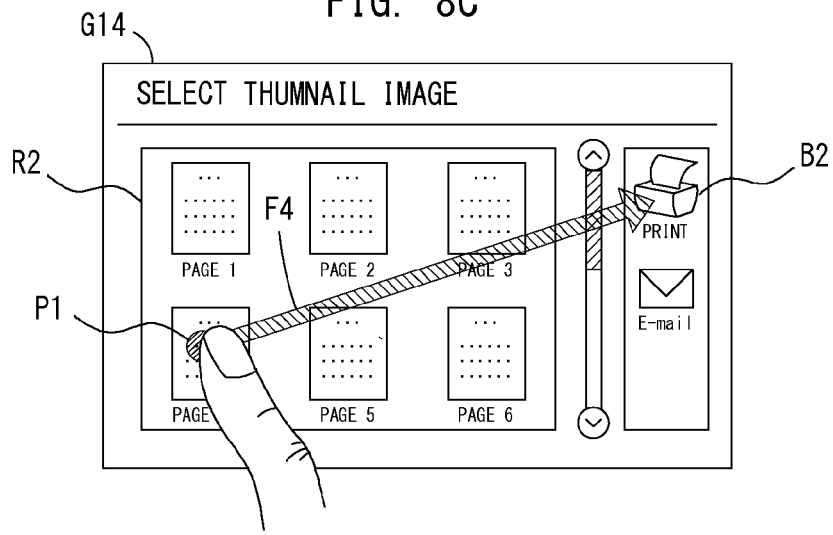

FIGS. 8A, 8B and 8C show an example of a thumbnail image screen G14 that shows a thumbnail image of an image read by the scanner section 2 or an image stored in the storage device 23. The thumbnail image screen G14 includes a thumbnail image region R2 in which multiple thumbnail images are displayed. On the thumbnail image screen G14, icon images B2 to start execution of a variety of jobs by dragging and moving the thumbnail images are displayed on the right side of the thumbnail image region R2. When the number of thumbnail images displayed in the thumbnail image region R2 is more than a predetermined number, the thumbnail image screen G14 allows scrolling and moving the thumbnail image region R2, thereby displaying all the thumbnail images as illustrated in FIG. 8A.

The gestures the user is allowed to input on the thumbnail image screen G14 are, for instance, single tapping and double tapping to select the thumbnail image. If the thumbnail image region R2 can be scrolled, the user may flick to scroll and move the thumbnail image region R2. As illustrated in FIG. 8B, the user may long tap one of the thumbnail images. The user makes long tap by tapping a point on the screen and keeping tapping the point for a predetermined period of time or longer without moving the tapped point. Once the thumbnail image is long tapped, menu icons M1 are displayed around the thumbnail image as illustrated in FIG. 8B. Also, the user may drag to move the thumbnail image to the display position of the icon image B2 as shown with an arrow F4 of FIG. 8C. As described above, five events, single tapping, dragging, flicking, double tapping and long tapping are receivable on the thumbnail image screen G14 illustrated in FIGS. 8A, 8B and 8C, and other events are not receivable. The setting part 31 sets five events, single tapping, dragging, flicking, double tapping and long tapping, corresponding to the thumbnail image screen G14 of FIGS. 8A, 8B and 8C.

Figure 9A:
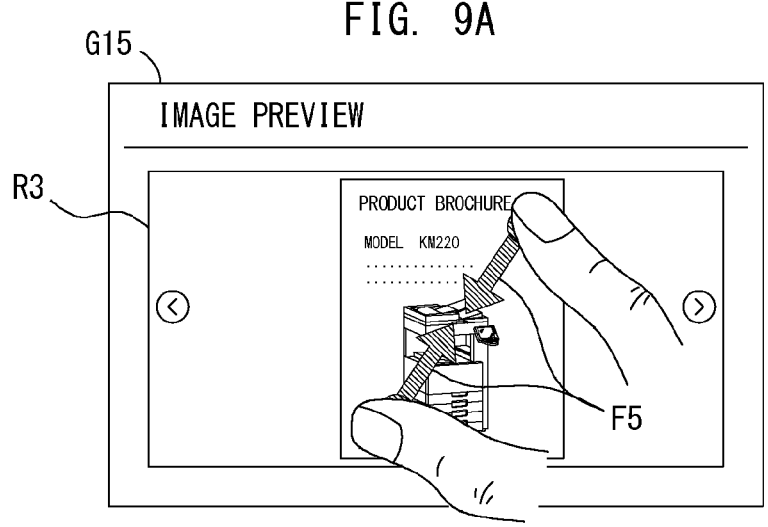
FIGS. 9A, 9B and 9C show an example of a preview image screen that shows a preview of an image.
Figure 9B:
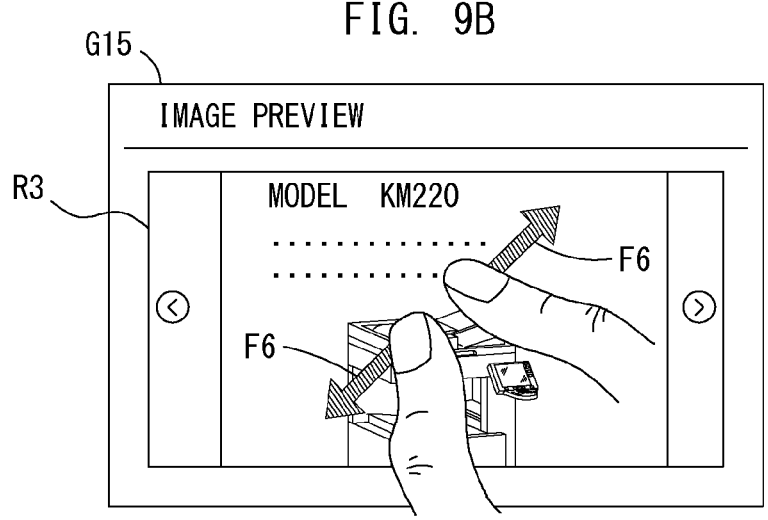
Figure 9C:
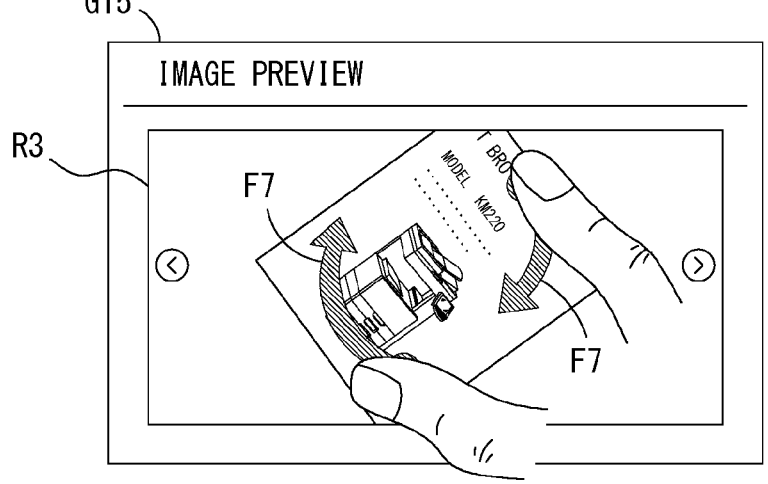

FIGS. 9A, 9B and 9C show an example of a preview image screen G15 that shows a preview of the image. The preview image screen G15 includes a preview region R3 in which the preview of the image selected by the user is displayed. On the preview image screen G15, the user is allowed to input pinching to zoom in, out or rotate the preview image. This pinching includes pinching in, pinching out and rotation. The user is allowed to zoom in the preview image by pinching in, to zoom out by pinching out and to rotate by rotation. The user pinches in by using two fingers to tap two points of the preview image displayed in the preview region R3 and move two fingers around to shorten the distance between the two points with tapping the two points as shown with arrows F5 of FIG. 9A. The user pinches in, thereby zooming in the preview image displayed in the preview region R3. The user pinches out by using two fingers to tap two points of the preview image displayed in the preview region R3 and move two fingers around to open the distance between the two points with tapping the two points as shown with arrows F6 of FIG. 9B. The user pinches out, thereby zooming out the preview image displayed in the preview region R3. The user rotates by using two fingers to tap two points of the preview image displayed in the preview region R3 and move two fingers around to turn the position between the two points with tapping the two points as shown with arrows F7 of FIG. 9C. The user rotates, thereby turning the preview image displayed in the preview region R3.

The user is allowed to zoom out the preview image on the preview image screen G15 not only by pinching out, but also by double tapping. The user taps twice the point of the preview image displayed in the preview region R3, and the preview image is enlarged based on the point. Moreover, the preview image screen G15 allows the user to drag when the preview image is already enlarged and the whole image of the preview image is not displayed in the preview region R3. In response to dragging, the enlarged part is moved and displayed.

As described above, three events, dragging, double tapping and pinching are receivable on the preview image screen G15 illustrated in FIGS. 9A, 9B and 9C, and other events are not receivable. The setting part 31 sets three events, dragging, double tapping and pinching, corresponding to the preview image screen G15 of FIGS. 9A, 9B and 9C.

Figure 10:
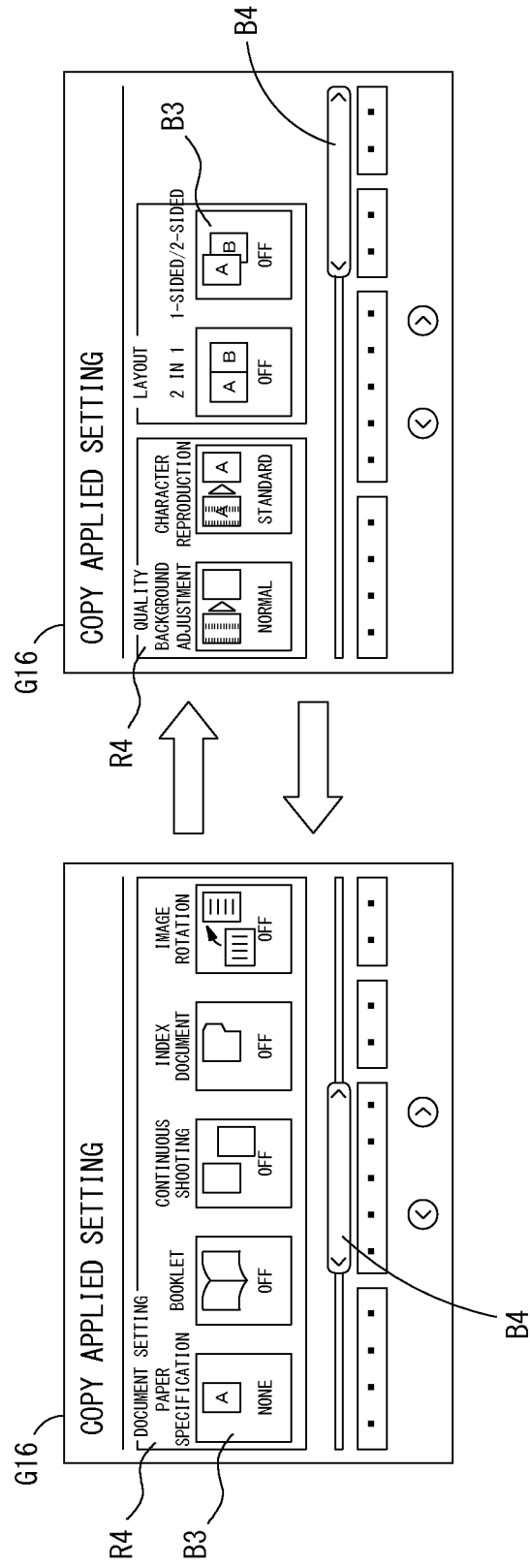
FIG. 10 shows an example of an applied setting screen relating to copy function.

FIG. 10 shows an example of an applied setting screen G16 relating to copy function. The applied setting screen G16 includes an icon image region R4 in which multiple icon images B3 registered in advance to configure a variety of applied settings as to copy function are laterally arranged. The applied setting screen G16 also includes a scroll bar B4 with which continuous icon image region R4 can be laterally scrolled. More specifically, the number of the icon images B3 registered in advance is more than the number of the icon images that can be displayed at once on the screen. Thus, the applied setting screen G16 allows the continuous icon image region R4 to be laterally scrolled by default. In the example of FIG. 10, the applied setting screen G16 is relating to copy function but this may also apply to other functions.

On the applied setting screen G16, the user is allowed to single tap, flick and drag. The user makes single tap to select, for instance, one of the icon images B3, and flicks the icon image region R4 to scroll the icon image region R4. The user also drags the scroll bar B4 to scroll the icon image region R4. Thus, three events, single tapping, flicking and dragging are receivable on the applied setting screen G16 illustrated in FIG. 10, and other events are not receivable. The setting part 31 sets three events, single tapping, flicking and dragging, corresponding to the applied setting screen G16 of FIG. 10.

Figure 11:
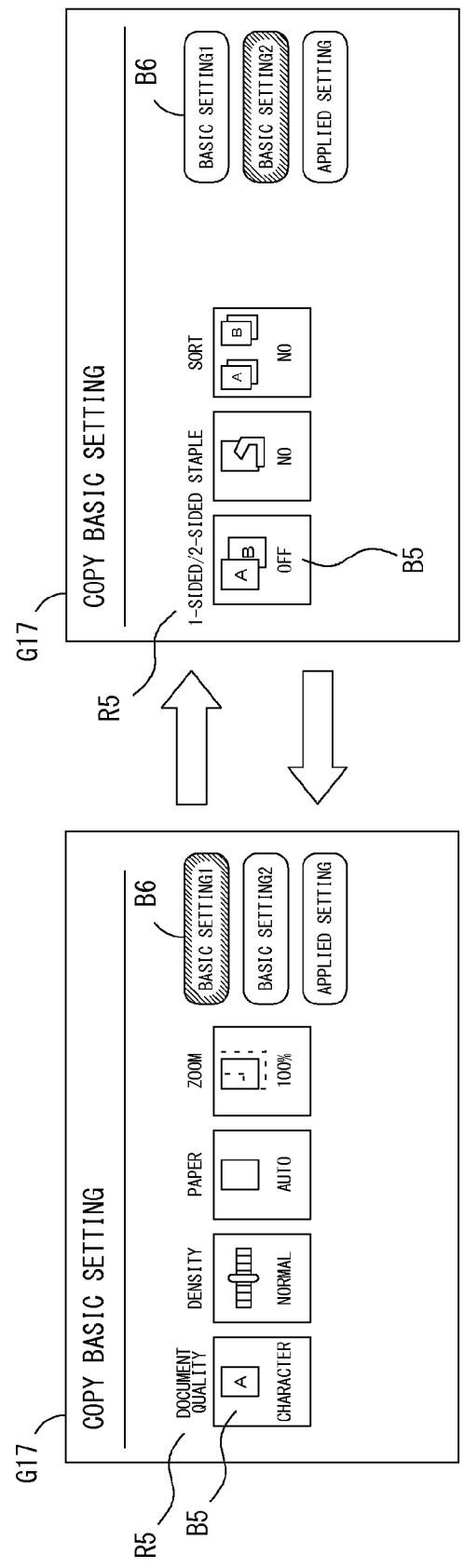
FIG. 11 shows an example of a basic setting screen relating to copy function.

FIG. 11 shows an example of a basic setting screen G17 relating to copy function. The basic setting screen G17 includes an icon image region R5 in which a group of multiple icon images B5 registered in advance to configure a variety of basic settings as to copy function are displayed. The basic setting screen G17 also includes switching buttons B6 with which the group of the icon images B5 displayed in the icon image region R5 is switched to another group. More specifically, the basic setting screen G17 is a screen that switches and shows each group of multiple operational keys classified in the respective groups. Thus, the basic setting screen G17 allows the icon image region R5 to be switched to display in a different manner by default. In the example of FIG. 11, the basic setting screen G17 is relating to copy function but this may also apply to other functions.

On the basic setting screen G17, the user is allowed to single tap and flick. The user makes single tap, for instance, the icon image B5 or the switching button B6, and flicks to switch the icon image region R5 to show another group without touching the switching button B6. Thus, two events, single tapping and flicking are receivable on the basic setting screen G17 illustrated in FIG. 11, and other events are not receivable. The setting part 31 sets two events, single tapping and flicking, corresponding to the basic setting screen G17 of FIG. 11.

FIG. 12 shows an exemplary relation between each of the aforementioned screens and the event receivable on the corresponding screen. In the example of FIG. 12, "YES" is marked for the event receivable on the corresponding screen and shaded areas show that the event is not receivable on the corresponding screen. As shown in the example of FIG. 12, there are multiple screens to be displayed on the display unit 5 of the operational panel 4, and the event receivable on each screen is different. As described above, the setting part 31 specifies the event receivable on each screen and sets the event to detect in response to the user's input corresponding to the respective screens. More specifically, the event set corresponding to each screen by the setting part 31 is the same as that shown in FIG. 12.

When, for example, the gesture is input by the user on the function selecting screen G10 being displayed, only three operational event determining routines 13e, 13f and 13b for flicking, dragging and single tapping are run one after the other in the loop processing (steps S7, S8 and S9) to specify the event corresponding to the user's gesture. Only necessary operational event determining routines are run one after the other also when the gesture is input by the user on the other screens being displayed on the display unit 5. In the present preferred embodiment, even when each of the multiple screens shown in the example of FIG. 12 is displayed on the display unit 5 of the operational panel 4, all of the plurality of operational event determining routines are not run one after the other and only the ones corresponding to the event associated with the screen is run.

Figure 13:
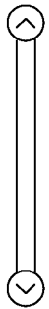
FIG. 13 shows an example of the list screen when it is not necessary to allow scrolling of a list region.

By referring to FIG. 12, flicking is conditionally receivable on each of the screens, the function selecting screen, the list screen and the thumbnail image screen. To be more specific, flicking is not the event which is always receivable on the screens, and is receivable only if a certain condition is met. It is assumed, for example, the amount of information shown in the list region R1 of the list screen G13 is larger than the predetermined amount as shown in FIG. 7. In this case, because whole information cannot be shown at once, the list region R1 needs to be scrolled to show the whole information. However, when the amount of information shown in the list region R1 is smaller than the predetermined amount, whole information may be shown in the screen at once. In such a case, the list region R1 is not necessary to be scrolled. FIG. 13 shows an example of the list screen G13 when it is not necessary to allow scrolling of the list region R1. As illustrated in FIG. 13, the number of the addresses shown in the list region R1 is less than the predetermined number. The list region R1 is, therefore, not necessary to be scrolled. In this case, flicking for scrolling is not receivable on the screen G13. Similarly, it is assumed, for example, the number of the icon images B1 shown on the function selecting screen G10 of FIG. 6 is equal to or less than the predetermined number (twelve). In such a case, as the icon image region is not necessary to be scrolled, flicking for scrolling is not receivable. It is also assumed, for example, the number of the thumbnail images shown in the thumbnail image region R2 of the thumbnail image screen G14 of FIG. 8 is equal to or less than the predetermined number. In such a case, as the thumbnail image region R2 is not necessary to be scrolled, flicking for scrolling is not receivable.

By referring to FIG. 12, the applied setting screen and the basic setting screen allow scrolling by default. So, flicking for scrolling is always receivable on the screens.

By referring to FIG. 12, dragging is conditionally receivable on the preview image screen. To be more specific, dragging is not the event which is always receivable on the screen, and is receivable only if a certain condition is met. As shown in the aforementioned FIG. 9B, it is assumed, for example, the preview image shown in the preview region R3 of the preview image screen G15 is enlarged. In this case, dragging for moving the enlarged area is receivable on the screen. When the preview image is not enlarged, it is not necessary to move the enlarged area. Therefore, dragging for moving the enlarged area is not receivable on the preview image screen G15.

In some cases, certain event is conditionally receivable on each screen displayed on the display unit 5 as described above. If the operational event determining routine corresponding to the certain event is then run at first, unnecessary determining processing may be performed at first. When associating the multiple events to detect with the respective screens displayed on the display unit 5, the setting part 31 of the present preferred embodiment sets priorities on each of the multiple events if the multiple events include the event conditionally receivable on the screen. More specifically, the conditionally receivable event is given low priority and the event always receivable with no condition is given high priority. The event corresponding to flicking, for instance, is given low priority and other events are given high priorities for the screens, the function selecting screen G10, the list screen G13 and the thumbnail image screen G14. Moreover, the event corresponding to dragging for moving the display position of the enlarged area is given low priority and other events are given high priorities for the preview image screen G15.

The user often scrolls or switches the applied setting screen and the basic setting screen as shown in FIGS. 10 and 11 at configuration of the settings. In this case, it is preferable to prioritize the determination whether or not the event is to scroll or switch the screen for determining the event corresponding to the user's input. The event for scrolling or switching is given high priority and the other events are given low priorities for the screen, such as the applied setting screen or the basic setting screen, which may receive the gesture by the user to scroll or switch by default.

The event determining part 33 runs the plurality of operational event determining routines associated with the screen one after the other in the loop processing (steps S7, S8 and S9) after the input is performed by the user. The event determining part 33 then sequentially runs the operational event determining routine in descending order of priorities of the events to which the operational event determining routines correspond. It is assumed, for example, the user inputs the gesture on each screen, the function selecting screen G10, the list screen G13 and the thumbnail image screen G14. In this case, the operational event determining routines except for the one for flicking are run in preference, and the flicking determining routine 13e is run at last. It is assumed, for example, the user inputs the gesture on the preview image screen G15. In this case, the operational event determining routines except for the one for dragging are run in preference, and the dragging determining routine 13f is run at last. It is also assumed, for example, the user inputs the gesture on the applied setting screen G16 or the basic setting screen G17. In this case, the flicking determining routine 13e is run in preference, and the operational event determining routines except for the one for flicking are run one after the other after the flicking determining routine 13e. As a result, even when the plurality of operational event determining routines are run one after the other in response to the user's input, unnecessary determining processing is not performed at first. Thus, the event corresponding to the user's input may be specified efficiently.

For running the plurality of operational event determining routines one after the other in the aforementioned loop processing (steps S7, S8 and S9), the event determining part 33 sequentially determines whether or not the user's input meets a variety of conditions defined in each determining routine. If every condition defined in the determining routine is met, the event corresponding to the user's input may be specified. If it is determined that any one of the conditions defined in the determining routine is not met, it becomes clear that the event corresponding to the user's input may not be specified with the determining routine. The event determining part 33 of the present preferred embodiment terminates running the operational event determining routine as it determines that any one of the conditions defined in the operational event determining routine is not met during the running operation of the operational event determining routine, and starts running the next operational event determining routine. Some detailed examples of the above-described operation are explained next.

Figure 14:
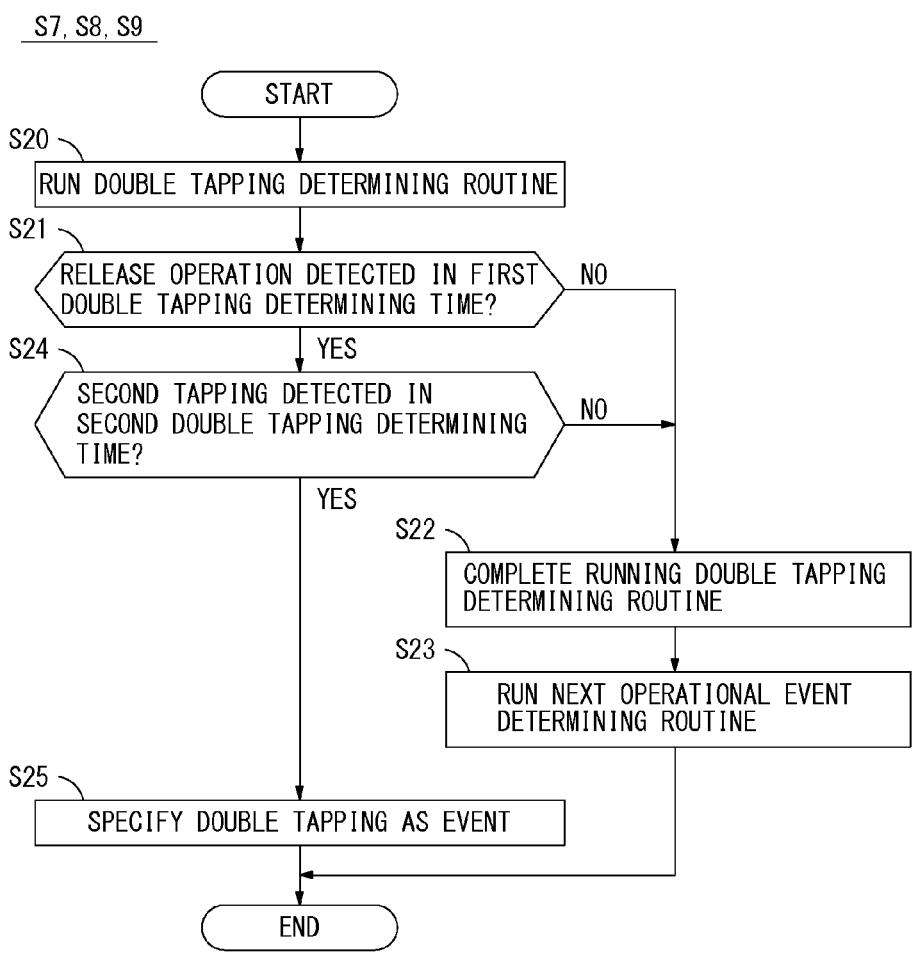
FIG. 14 is a flow diagram explaining the exemplary sequential procedure of the process realized for running a double tapping determining routine.

FIG. 14 is a flow diagram explaining the exemplary sequential procedure of the process realized when the CPU 11 (the event determining part 33) runs the double tapping determining routine 13c in the aforementioned loop processing (steps S7, S8 and S9). Upon start of this process, the CPU 11 selects and runs the double tapping determining routine 13c among from the plurality of operational event determining routines 13b, 13c, 13d, 13e, 13f and 13g (step S20).

Information relating to two conditions, the first double tapping determining time and the second double tapping determining time for determining double tapping based on the information received from the touch sensor 6a, is defined in the double tapping determining routine 13c. The first double tapping determining time refers to a period of time that is calculated from detecting the first tapping until the tapped state is released on the screen, and the second double tapping determining time refers to a period of time that is calculated from detecting the release operation of the first tapped state until detecting the second tapping. More specifically, it is assumed that it is detected the first tapped state has been released in the first double tapping determining time after the first tapping is detected, and the second tapping has detected in the second double tapping determining time after it is detected the first tapped state has been released. Then, it allows specifying that the user's input is the double tapping.

After running the double tapping determining routine 13c in step S20, the CPU 11 determines as the first condition whether or not the release operation is detected in the first double tapping determining time (step S21). When the release operation of the first tapped state has not been detected after the first double tapping determining time has elapsed (when a result of step S21 is NO), the CPU 11 completes running the double tapping determining routine 13c without conducting the following condition determination (step S22), and starts running the next operational event determining routine (step S23).

When the release operation of the first tapped state is detected after the first double tapping determining time has elapsed (when a result of step S21 is YES), the CPU 11 determines as the second condition whether or not the second tapping has detected in the second double tapping determining time after the release operation of the first tapped state is detected (step S24). When the second tapping has not been detected even after the second double tapping determining time has elapsed (when a result of step S24 is NO), the CPU 11 completes running the double tapping determining routine 13c (step S22), and starts running the next operational event determining routine (step S23). When the second tapping has been detected in the second double tapping determining time (when a result of step S24 is YES), the CPU 11 specifies double tapping as the event corresponding to the user's input (step S25). After the event is specified as described above, the CPU 11 completes the loop processing (steps S7, S8 and S9).

Figure 15:
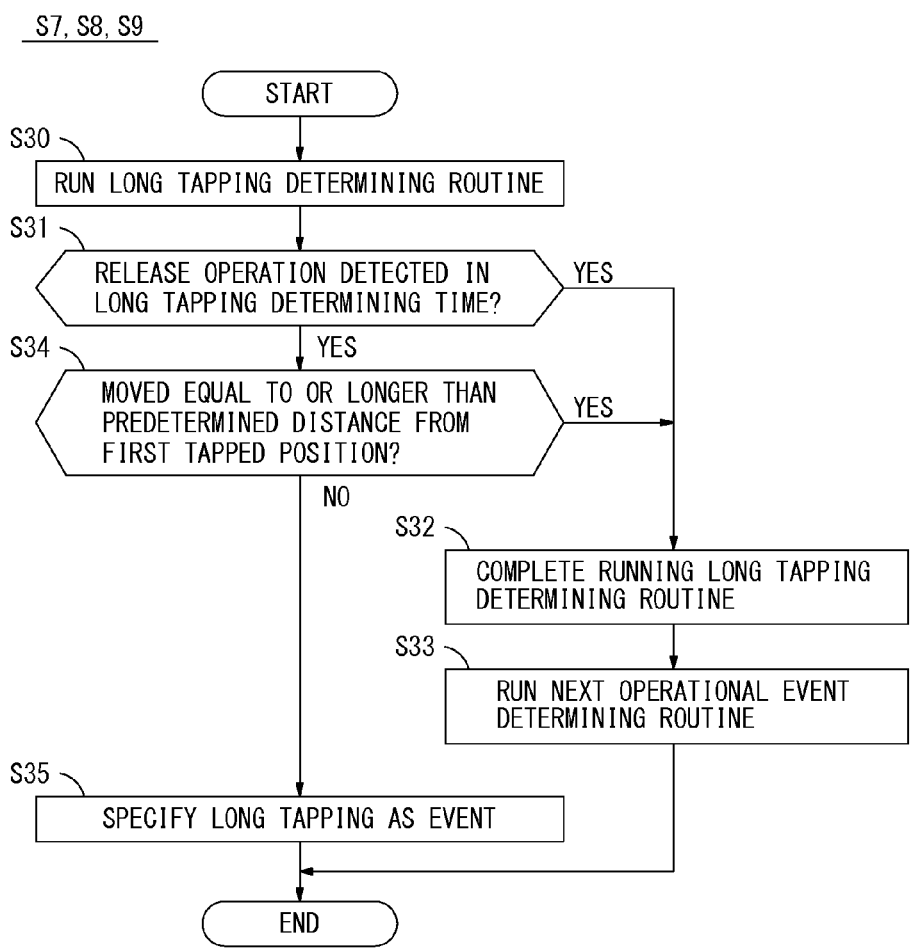
FIG. 15 is a flow diagram explaining the exemplary sequential procedure of the process realized for running a long tapping determining routine.

FIG. 15 is a flow diagram explaining the exemplary sequential procedure of the process realized when the CPU 11 (the event determining part 33) runs the long tapping determining routine 13d in the aforementioned loop processing (steps S7, S8 and S9). Upon start of this process, the CPU 11 selects and runs the long tapping determining routine 13d among from the plurality of operational event determining routines 13b, 13c, 13d, 13e, 13f and 13g (step S30).

Information relating to two conditions, long tapping determining time and long tapping determining distance for determining long tapping based on the information received from the touch sensor 6a, is defined in the long tapping determining routine 13d. The long tapping determining time refers to a period of time that is calculated from detecting tapping until the tapped state is released on the screen, and the long tapping determining distance refers to a moving distance of the tapped position from the previously detected tapped position. More specifically, it is assumed that the release operation of the tapped state is not detected in the long tapping determining time after tapping is detected, and the moving distance of the tapped position is within the range of the long tapping determining distance. Then, it allows specifying that the user's input is the long tapping.

After running the long tapping determining routine 13d in step S30, the CPU 11 determines as the first condition whether or not the release operation of the tapped state has been detected in the long tapping determining time (step S31). When the release operation of the tapped state has been detected in the long determining time (when a result of step S31 is YES), the CPU 11 completes running the long tapping determining routine 13d without conducting the following condition determination (step S32), and starts running the next operational event determining routine (step S33).

When the release operation the tapped state has not been detected in the first long tapping determining time (when a result of step S31 is NO), the CPU 11 determines as the second condition whether or not the moving distance of the tapped position is equal to or longer than a predetermined distance defined by the long tapping determining distance (step S34). When the tapped position has moved equal to or longer than the predetermined distance (when a result of step S34 is YES), the CPU 11 completes running the long tapping determining routine 13d (step S32), and starts running the next operational event determining routine (step S33). When the tapped position has moved within the range of the predetermined distance (when a result of step S34 is NO), the CPU 11 specifies long tapping as the event corresponding to the user's input (step S35). Also in this case, the CPU 11 completes the loop processing (steps S7, S8 and S9).

Figure 16:
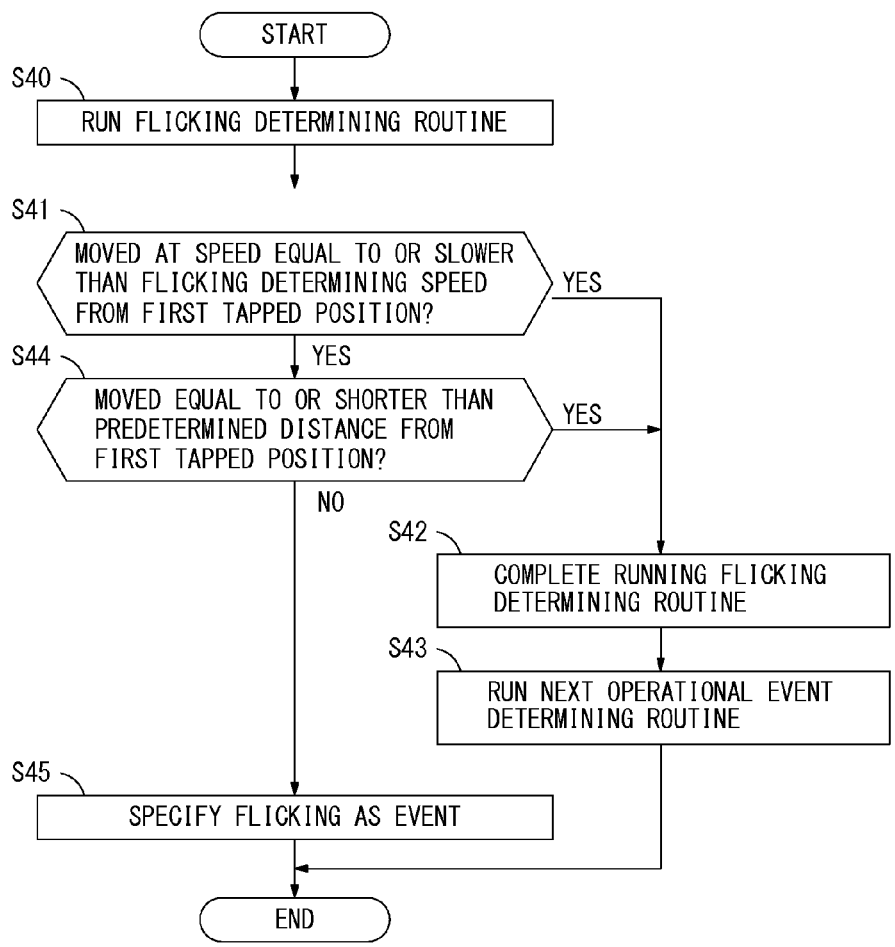
FIG. 16 is a flow diagram explaining the exemplary sequential procedure of the process realized for running a flicking determining routine.

FIG. 16 is a flow diagram explaining the exemplary sequential procedure of the process realized when the CPU 11 (the event determining part 33) runs the flicking determining routine 13e in the aforementioned loop processing (steps S7, S8 and S9). Upon start of this process, the CPU 11 selects and runs the flicking determining routine 13e among from the plurality of operational event determining routines 13b, 13c, 13d, 13e, 13f and 13g (step S40).

Information relating to two conditions, flicking determining speed and flicking determining distance for determining flicking based on the information received from the touch sensor 6a, is defined in the flicking determining routine 13e. The flicking determining speed refers to speed at which a tapped position is moved from the previously detected tapped position, and the flicking determining distance refers to a moving distance of the tapped position from the previously detected tapped position. More specifically, it is assumed that the tapped position has moved at the speed equal to or faster than the flicking determining speed from the previously detected tapped position, and the moving distance of the tapped position is equal to or longer than the flicking determining distance. Then, it allows specifying that the user's input is the flicking.

After running the flicking determining routine 13e in step S40, the CPU 11 determines as the first condition whether or not the tapped position has moved at the speed equal to or slower than the flicking determining speed (step S41). When the tapped position has moved at the speed equal to or slower than the flicking determining speed (when a result of step S41 is YES), the CPU 11 completes running the flicking determining routine 13e without conducting the following condition determination (step S42), and starts running the next operational event determining routine (step S43).

When the tapped position has moved at the speed in excess of the flicking determining speed (when a result of step S41 is NO), the CPU 11 determines, as the second condition, whether or not the moving distance of the tapped position is equal to or shorter than a predetermined distance defined by the flicking determining distance (step S44). When the tapped position has moved equal to or shorter than the predetermined distance (when a result of step S44 is YES), the CPU 11 completes running the flicking determining routine 13e (step S42), and starts running the next operational event determining routine (step S43). When the tapped position has moved longer than the predetermined distance (when a result of step S44 is NO), the CPU 11 specifies flicking as the event corresponding to the user's input (step S45). Also in this case, the CPU 11 completes the loop processing (steps S7, S8 and S9).

In the loop processing (steps S7, S8 and S9) as described above, when the CPU 11 determines that any one of the multiple conditions defined in the operational event determining routine is not met, it completes running the operational event determining routine and runs the next operational event determining routine, resulting in enhanced processing efficiency.

Figure 17:
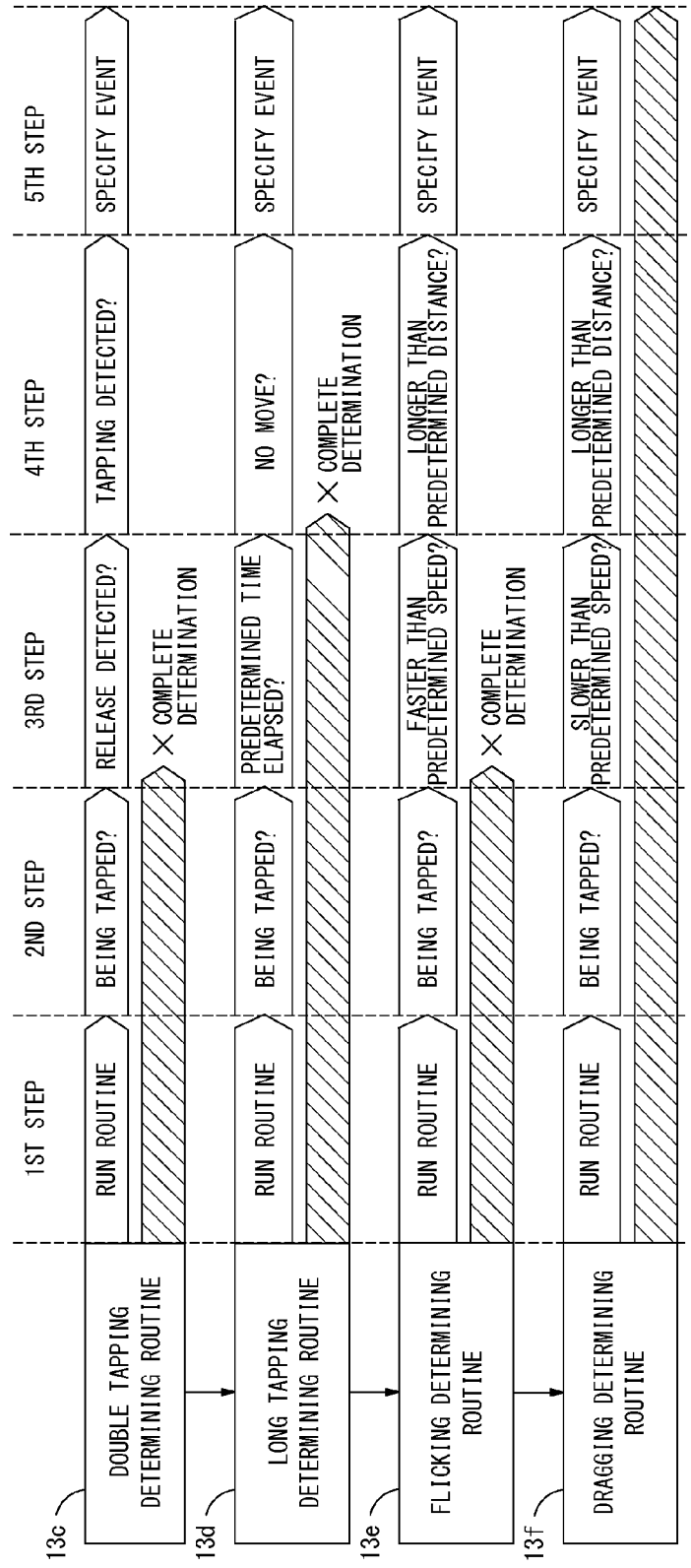
FIG. 17 shows an exemplary sequence of the process realized when each of the plurality of operational event determining routines is run one after the other in a loop processing.

FIG. 17 shows an exemplary sequence of the process realized when each of the double tapping determining routine 13c, the long tapping determining routine 13d, the flicking determining routine 13e and the dragging determining routine 13f is run one after the other in the loop processing (steps S7, S8 and S9). It is assumed, for instance, that the user's input is dragging. In this case, by running the double tapping determining routine 13c which is run at the first, the release operation is not detected at the third step. The determination with the double tapping determining routine 13c is complete then, and the next long tapping determining routine 13d is run. By running the long tapping determining routine 13d, it is detected that the tapped position has moved equal to or longer than the predetermined distance at the forth step. The determination with the long tapping determining routine 13d is complete then, and the next flicking determining routine 13e is run. By running the flicking determining routine 13e, it is detected that the tapped position has moved at the speed slower than the predetermined rate at the third step. The determination with the flicking determining routine 13e is complete then, and the next dragging determining routine 13f is run. By running the dragging determining routine 13f, the determination process in the first to the fifth steps is performed, then finally specifying that the event corresponding to the user's input is dragging.

In the above-described case, the determinations in the fourth and fifth steps are not conducted with the double tapping determining routine 13c which is run at the first. The determination in the fifth step is not conducted with the long tapping determining routine 13d which is run at the second, and the determinations in the fourth and fifth steps are not conducted with the flicking determining routine 13e which is run at the third. Thus, the following operational event determining routine is allowed to be run efficiently, resulting in reduction of time to specify the event corresponding to the user's input.

As described above, the image processing device 1 of the present preferred embodiment sets in advance the event to detect in response to the user's input among from the multiple events by associating it with each screen displayed on the display unit 5. In response to detecting the user's input on the screen, the image processing device 1 runs only the operational event determining routine corresponding to the event associated in advance with the screen of the plurality of operational event determining routines 13b, 13c, 13d, 13e, 13f and 13g, each of which corresponds to the respective events, thereby specifying the event corresponding to the user's input. To be more specific, even when detecting the user's input on the screen, the image processing device 1 of this configuration is not required to run each of the plurality of operational event determining routines 13b, 13c, 13d, 13e, 13f and 13g one after the other. The image processing device 1 is allowed to run only the necessary operational event determining routine corresponding to the screen displayed on the display unit 5. As a result, the load on the CPU 11 may be reduced, and the event corresponding to the user's input may be specified efficiently. Thus, it may resolve the problem of having low productivity of the image processing device 1.

In response to being powered on, the image processing device 1 of the present preferred embodiment analyzes each type of the displayable screen on the display unit 5, thereby specifying the event to detect on each screen and associating the specified event with each screen. Even when the screen displayed on the display unit 5 is customized, for example, the image processing device 1 is restarted so that the event corresponding to the customized screen may be associated at the restart.

For associating the multiple events to detect with the respective screens displayed on the display unit 5, the image processing device 1 of the present preferred embodiment sets priorities on each of the multiple events to associate with the respective screens. In response to detecting the user's input as one of the screens is being displayed, the image processing device 1 runs the operational event determining routines in descending order of priorities of the events to which the operational event determining routines correspond. As a result, the event corresponding to the user's input may be specified much more efficiently.

[mi1] As described above, when the user's input is detected, all the plurality of the operational event determining routines are not run one after the other and the necessary operational event determining routine is run in response to the screen being displayed. Thus, the event corresponding to the user's input may be specified efficiently.

(Modifications)[mi2]

While the preferred embodiment of the present invention has been described above, the present invention is not limited to the preferred embodiment. Various modifications may be applied to the present invention.

The image processing device 1 of the above-described present preferred embodiment is shown to be one of MFPs, for example. The image processing device 1 is not necessarily the device such as the MFPs. The image processing device 1 may be one of single purpose devices such as printers, fax machines, copiers and scanners. Also, the image processing device 1 is not necessary to be a device executing aforementioned jobs, and may be one of the portable terminals.

Mainly in the above-described preferred embodiment, the setting part 31 analyzes the various types of displayable screens on the display unit 5 in response to being powered on, thereby specifying the event to detect on each screen and associates the specified event with each screen. The timing of analysis is not necessary to be that mentioned above. The setting part 31 may analyze the screen when the screen is displayed on the display unit 5 by the display controlling part 32 and associate the event with the screen. In such a case, the event to be detected may be set when the screen is actually displayed on the display unit 5. Therefore, as illustrated in FIG. 13, when the amount of information displayed in the list region R1 of the list screen G13 is less than the predetermined amount, it is not always necessary to associate in advance the event corresponding to flicking to scroll the list region R1 with the screen, resulting in more enhanced process efficiency.

What is claimed is:

1. An image processing device, comprising:
a display part on which various types of screens are displayed;
a manipulation detecting part for detecting an input by a user on the screen of said display part;
a setting part for setting an event for each of multiple displayable screens displayed on said display part by associating in advance the event which is possibly received on each screen among from multiple events that may be detected by said manipulation detecting part with each screen;
an event determining part for running only an operational event determining routine corresponding to the event associated by said setting part with the screen being displayed on said display part of multiple operational event determining routines, each of which corresponds to said respective events, when the user's input is detected by said manipulation detecting part, thereby specifying the event corresponding to the user's input; and
a controlling part for controlling operations based on the event specified by said event determining part.

2. The image processing device according to claim 1, wherein
said setting part, in response to being powered on, analyzes the various types of displayable screens on said display part, thereby specifying the event to detect on the respective screens and associating the specified event with each screen.

3. The image processing device according to claim 1, wherein
said setting part selects the event to detect on each screen displayed on said display part among from flicking, dragging, single tapping, double tapping, long tapping and pinching, and associates the selected event with the screen.

4. The image processing device according to claim 3, wherein
the various types of screens displayed on said display part includes a scroll screen on which multiple pieces of information in a list form can be displayed by scrolling the information, and
said setting part associates only flicking, dragging, single tapping and double tapping with said scroll screen as the event to detect on said scroll screen.

5. The image processing device according to claim 3, wherein
the various types of screens displayed on said display part includes a thumbnail image screen on which multiple thumbnail images can be displayed by scrolling the thumbnail images, and
said setting part associates only flicking, dragging, single tapping, double tapping and long tapping with said thumbnail image screen as the event to detect on said thumbnail image screen.

6. The image processing device according to claim 3, wherein
the various types of screens displayed on said display part includes an operational key screen on which multiple operational keys can be displayed by scrolling the operational keys, and
said setting part associates only flicking, dragging and single tapping with said operational key screen as the event to detect on said operational key screen.

7. The image processing device according to claim 3, wherein
the various types of screens displayed on said display part includes a preview image screen on which a preview image is displayed and which allows zoom in or out the preview image, and
said setting part associates only dragging, double tapping and pinching with said preview image screen as the event to detect on said preview image screen.

8. The image processing device according to claim 3, wherein
the various types of screens displayed on said display part includes a group switching screen on which a group of multiple operational keys classified in multiple groups can be displayed by switching the group, and
said setting part associates only flicking and single tapping with said group switching screen as the event to detect on said group switching screen.

9. The image processing device according to claim 1, wherein
said setting part, in response to associating a plurality of events to detect with one of the screens displayed on said display part, sets priorities on each of the plurality of events based on said screen, and
said event determining part, when said manipulation detecting part detects the user's input with said screen being displayed, runs the operational event determining routines in descending order of said priorities of the events to which the operational event determining routines correspond.

10. The image processing device according to claim 9, wherein said setting part, when said screen allows scrolling depending on how many pieces of information is displayed, gives lower priority to the event for scrolling than other events.

11. The image processing device according to claim 9, wherein
said setting part, when said screen allows scrolling by default, gives higher priority to the event for scrolling than other events.

12. The image processing device according to claim 9, wherein
said setting part, when said screen allows moving a displayed position of the preview image with the enlarged preview image being displayed, gives lower priority to the event for moving the displayed position of the preview image than other events.

13. The image processing device according to claim 1, wherein
said event determining part, in response to receiving the user's input on the screen of said display part, consecutively runs the operational event determining routine corresponding to said event for every event which may be detected by said manipulation detecting part, thereby specifying the event corresponding to the user's input, and
said event determining part, in response to receiving the user's input on the screen with which the event may be received is associated in advance by said setting part, consecutively runs the operational event determining routine corresponding to said event only for the event which is associated by said setting part, thereby specifying the event corresponding to the user's input.

14. The image processing device according to claim 13, wherein
said event determining part, in response to receiving the user's input on the screen with which the event may be received is associated in advance by said setting part, does not run the operational event determining routine except for the operational event determining routine corresponding to said event which is associated by said setting part.

15. The image processing device according to claim 1, wherein
said display part displays only one out of said multiple displayable screens at one time without displaying any other of said multiple displayable screens.

16. An image processing device comprising:
a display part on which various types of screens are displayed;
a manipulation detecting part for detecting an input by a user on the screen of said display part;
a setting part for setting an event to detect in response to the user's input among from multiple events by associating the event with each screen displayed on said display part;
an event determining part for running only an operational event determining routine corresponding to the event associated by said setting part with the screen being displayed on said display part of multiple operational event determining routines, each of which corresponds to said respective events, when the user's input is detected by said manipulation detecting part, thereby specifying the event corresponding to the user's input; and
a controlling part for controlling operations based on the event specified by said event determining part,
wherein said event determining part, in response to running the operational event determining routine corresponding to double tapping, terminates execution of the operational event determining routine corresponding to double tapping and starts running the next operational event determining routine when a release operation of a first tapped state is not detected after a first double tapping determining time elapses from the time the first tapping is detected by said manipulation detecting part or when a second tapping is not detected in a second double tapping determining time after the release operation of the first tapped state is detected.

17. An image processing device comprising:
a display part on which various types of screens are displayed;
a manipulation detecting part for detecting an input by a user on the screen of said display part;
a setting part for setting an event to detect in response to the user's input among from multiple events by associating the event with each screen displayed on said display part;
an event determining part for running only an operational event determining routine corresponding to the event associated by said setting part with the screen being displayed on said display part of multiple operational event determining routines, each of which corresponds to said respective events, when the user's input is detected by said manipulation detecting part, thereby specifying the event corresponding to the user's input; and
a controlling part for controlling operations based on the event specified by said event determining part,
wherein said event determining part, in response to running the operational event determining routine corresponding to long tapping, terminates execution of the operational event determining routine corresponding to long tapping and starts running the next operational event determining routine when the release operation of a tapped state is detected in a long tapping determining time after the tapping is detected by said manipulation detecting part or when it is detected that a tapped position has moved equal to or longer than a predetermined distance after the tapping is detected by said manipulation detecting part.

18. An image processing device comprising:
a display part on which various types of screens are displayed;
a manipulation detecting part for detecting an input by a user on the screen of said display part;
a setting part for setting an event to detect in response to the user's input among from multiple events by associating the event with each screen displayed on said display part;
an event determining part for running only an operational event determining routine corresponding to the event associated by said setting part with the screen being displayed on said display part of multiple operational event determining routines, each of which corresponds to said respective events, when the user's input is detected by said manipulation detecting part, thereby specifying the event corresponding to the user's input; and
a controlling part for controlling operations based on the event specified by said event determining part,
wherein said event determining part, in response to running the operational event determining routine corresponding to flicking, terminates execution of the operational event determining routine corresponding to flicking and starts running the next operational event determining routine when it is detected that a tapped position has moved at a speed equal to or slower than a flicking determining speed after the tapping is detected by said manipulation detecting part or when it is detected that the tapped position has moved equal to or shorter than a predetermined distance after the tapping is detected by said manipulation detecting part.

19. A non-transitory computer readable recording medium on which a program is recorded, said program executable on a computer including a display part on which various types of screens are displayed and a manipulation detecting part for detecting an input by a user on the screen of said display part, said program executed on said computer to function as a system comprising:

a setting part for setting an event for each of multiple displayable screens displayed on said display part by associating-the-event in advance the event which is possibly received on each screen among from multiple events that may be detected by said manipulation detecting part with each screen displayed on said display part;

an event determining part for running only an operational event determining routine corresponding to the event associated by said setting part with the screen being displayed on said display part of multiple operational event determining routines, each of which corresponds to said respective events, when the user's input is detected by said manipulation detecting part, thereby specifying the event corresponding to the user's input; and a controlling part for controlling operations based on the event specified by said event determining part.

20. An operational event determining method for determining an event corresponding to an input by a user with a display part on which various types of screens are displayed based on the user's input, comprising the steps of:

(a) setting the event for each of multiple displayable screens displayed on said display part by associating the event in advance the event which is possibly received on each screen among from multiple events that may be input by the user with each screen displayed on said display part;

(b) detecting the input by the user with one of the screens being displayed on said display part; and (c) running only an operational event determining routine corresponding to the event associated with said screen of multiple operational event determining routines, each of which corresponds to said respective events, thereby determining the event corresponding to the user's input.

* * * * *